(12) United States Patent
Gumus et al.

(10) Patent No.: US 10,060,208 B2
(45) Date of Patent: Aug. 28, 2018

(54) AUTOMATIC EVENT DETECTION AND CONTROL WHILE DRILLING IN CLOSED LOOP SYSTEMS

(71) Applicant: Weatherford Technology Holdings, LLC, Houston, TX (US)

(72) Inventors: Ferhat Gumus, Houston, TX (US); Koray Kinik, Houston, TX (US); Lev Ring, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 370 days.

(21) Appl. No.: 14/628,850

(22) Filed: Feb. 23, 2015

(65) Prior Publication Data

US 2016/0245027 A1    Aug. 25, 2016

(51) Int. Cl.
*E21B 21/08* (2006.01)
*E21B 7/00* (2006.01)
*E21B 47/06* (2012.01)
*E21B 44/00* (2006.01)
*G05B 19/04* (2006.01)

(52) U.S. Cl.
CPC ............... *E21B 21/08* (2013.01); *E21B 7/00* (2013.01); *E21B 44/00* (2013.01); *E21B 47/06* (2013.01); *G05B 19/041* (2013.01); *G05B 2219/45129* (2013.01)

(58) Field of Classification Search
CPC ......... E21B 21/08; E21B 47/061; E21B 44/00
See application file for complete search history.

(56) References Cited

U.S. PATENT DOCUMENTS

| 2,290,408 A | 7/1942 | Crites |
| 3,443,643 A | 5/1969 | Jones |
| 3,470,971 A | 10/1969 | Dower |

(Continued)

FOREIGN PATENT DOCUMENTS

| WO | 2004/020778 A1 | 3/2004 |
| WO | 2012138349 A1 | 10/2012 |

OTHER PUBLICATIONS

"Standpipe Pressure", downloaded Mar. 20, 2017, https://www.petropedia.com/definition/3692/standpipe-pressure, 1 page.*

(Continued)

*Primary Examiner* — Jennifer H Gay
(74) *Attorney, Agent, or Firm* — Blank Rome LLP

(57) ABSTRACT

Controlled pressure drilling of a borehole with a drilling system detects events and identifies the events as being one of a gas-at-surface event, a kick event, a high-pressure low-volume depletion event, and a gas expansion event. Parameters including flow-in, flow-out, density, and standpipe pressure are monitored. A volume increase is detected between the flow-in and flow-out, and an initiation point of the detected volume increase is identified. At this point, an event from the initiation point is identified based on the monitored parameters from the initiation point. To identify a kick event, for example, the standpipe pressure is determined to have increased from the initiation point without the density decreasing since the initiation point, and a cumulative volume value from the initiation point is determined to be above a first threshold. In response to the identified event, an action is initiated in the drilling system.

37 Claims, 11 Drawing Sheets

(56) References Cited

U.S. PATENT DOCUMENTS

| | | | |
|---|---|---|---|
| 3,552,502 A * | 1/1971 | Wilson, Sr. | E21B 21/08 175/218 |
| 3,827,511 A * | 8/1974 | Jones | E21B 21/08 166/91.1 |
| 5,275,040 A * | 1/1994 | Codazzi | E21B 21/08 166/254.1 |
| 5,952,569 A | 9/1999 | Jervis et al. | |
| 6,234,250 B1 | 5/2001 | Green et al. | |
| 6,371,204 B1 | 4/2002 | Singh et al. | |
| 6,374,925 B1 | 4/2002 | Elkins et al. | |
| 6,484,816 B1 * | 11/2002 | Koederitz | E21B 21/08 175/25 |
| 6,527,062 B2 | 3/2003 | Elkins et al. | |
| 6,755,261 B2 | 6/2004 | Koederitz | |
| 6,820,702 B2 | 11/2004 | Niedermayr et al. | |
| 6,920,942 B2 | 7/2005 | Koederitz | |
| 7,044,237 B2 * | 5/2006 | Leuchtenberg | E21B 21/08 166/53 |
| 7,278,496 B2 | 10/2007 | Leuchtenberg | |
| 7,367,411 B2 | 5/2008 | Leuchtenberg | |
| 7,650,950 B2 | 1/2010 | Leuchtenberg | |
| 8,528,660 B2 | 9/2013 | Santos | |
| 2005/0194184 A1 * | 9/2005 | Gleitman | E21B 17/028 175/45 |
| 2006/0207795 A1 * | 9/2006 | Kinder | E21B 21/08 175/38 |
| 2009/0194330 A1 * | 8/2009 | Gray | E21B 21/00 175/24 |
| 2011/0139464 A1 * | 6/2011 | Henderson | E21B 21/01 166/370 |
| 2011/0139506 A1 * | 6/2011 | Lovorn | E21B 21/10 175/25 |
| 2011/0214882 A1 * | 9/2011 | Santos | E21B 21/08 166/373 |
| 2011/0259612 A1 * | 10/2011 | Lovorn | E21B 21/08 166/387 |
| 2012/0037361 A1 | 2/2012 | Santos et al. | |
| 2012/0165997 A1 * | 6/2012 | Lewis | E21B 44/005 700/282 |
| 2012/0186873 A1 * | 7/2012 | Shayegi | E21B 44/00 175/25 |
| 2012/0255776 A1 * | 10/2012 | Knudsen | E21B 21/08 175/25 |
| 2012/0285744 A1 * | 11/2012 | Bernard | E21B 21/08 175/57 |
| 2012/0292109 A1 * | 11/2012 | Lovorn | E21B 21/08 175/25 |
| 2012/0305314 A1 * | 12/2012 | Maida, Jr. | E21B 44/00 175/50 |
| 2013/0112404 A1 * | 5/2013 | Lovorn | E21B 33/085 166/250.01 |
| 2013/0133948 A1 * | 5/2013 | Lovorn | E21B 21/08 175/24 |
| 2014/0048331 A1 | 2/2014 | Boutarlbi et al. | |
| 2014/0262246 A1 * | 9/2014 | Li | E21B 21/08 166/250.08 |
| 2014/0290964 A1 * | 10/2014 | Lovorn | E21B 34/10 166/375 |
| 2014/0291023 A1 * | 10/2014 | Edbury | E21B 44/00 175/24 |
| 2015/0083401 A1 * | 3/2015 | Saeed | E21B 34/02 166/250.01 |
| 2015/0152700 A1 * | 6/2015 | Lovorn | E21B 47/06 175/57 |
| 2015/0240579 A1 * | 8/2015 | Lovorn | E21B 21/08 166/373 |
| 2016/0084024 A1 * | 3/2016 | Dillard | E21B 21/08 175/48 |
| 2016/0097270 A1 * | 4/2016 | Pobedinski | E21B 44/00 700/275 |
| 2016/0138351 A1 * | 5/2016 | Dillard | E21B 21/08 175/25 |
| 2016/0222741 A1 * | 8/2016 | Lovorn | E21B 47/06 |
| 2016/0237810 A1 * | 8/2016 | Beaman, Jr. | E21B 47/10 |
| 2016/0245027 A1 * | 8/2016 | Gumus | E21B 21/08 |
| 2016/0273331 A1 * | 9/2016 | Davis | E21B 21/08 |
| 2017/0037691 A1 * | 2/2017 | Savage | E21B 21/08 |
| 2017/0044857 A1 * | 2/2017 | Leuchtenberg | E21B 33/085 |

OTHER PUBLICATIONS

Kinik, K. et al.(Weatherford), "A Case Study: First Field Application of Fully Automated Kick Detection and Control by MPD System in Western Canada", SPE-168948-MS, Society of Petroleum Engineers, SPE/IADC Managed Pressure Drilling & Underbalanced Operations Conference & Exhibition, Apr. 8-9, 2014.

Geoservices, "Early Kick Detection—ALS-K", copyright © 2002.

Kinik, K et al. (Weatherford), "Fully Automated MPD System Controls Well in Western Canada", Exploration & Production | Fully Automated MPD System Controls Well in Western Canada, Nov. 3, 2014.

Carlsen, Liv A. et al. "Utilizing Instrumented Stand Pipe for Monitoring Drilling Fluid Dynamics for Improving Automated Drilling Operations," Proceedings of the 2012 IFAC Workshop on Automatic Control in Offshore Oil and Gas Production, May 31-Jun. 1, 2012, pp. 217-222.

Int'l Search Report and Written Opinion in counterpart PCT Appl. PCT/US2016/019023, dated Jul. 12, 2016, 10-pgs.

First Examination Report in counterpart AU Appl. 2016222953; dated May 10, 2018; 4 pgs.

First Office Action in counterpart CA Appl. 2976641 dated Jun 26, 2018; 4 pgs.

* cited by examiner

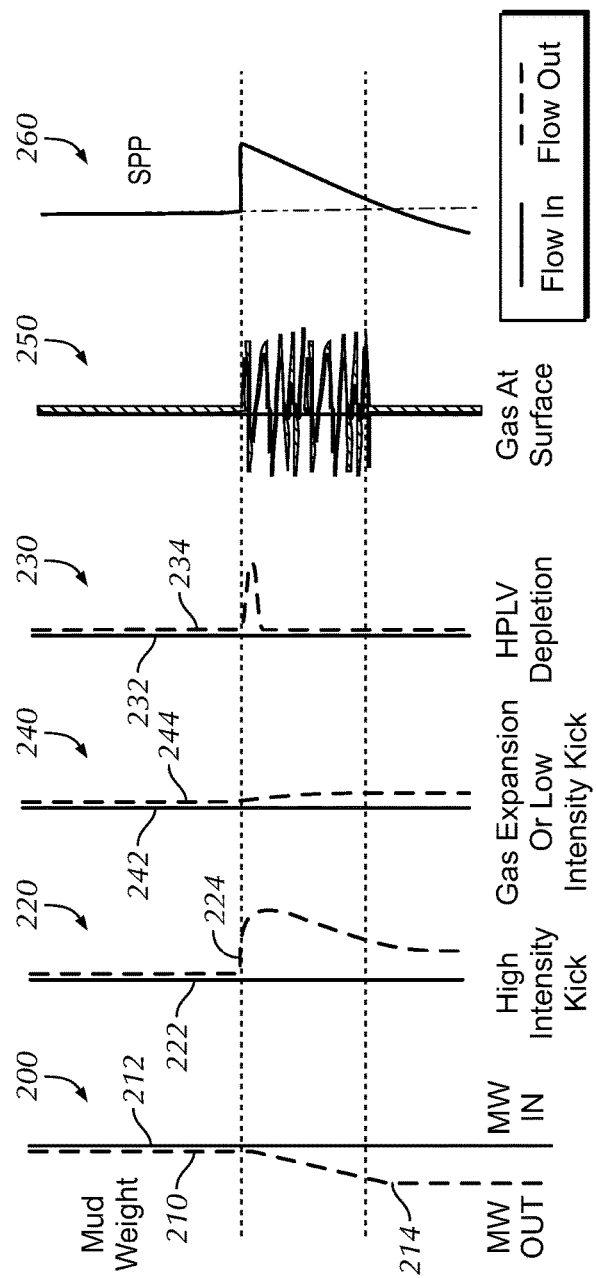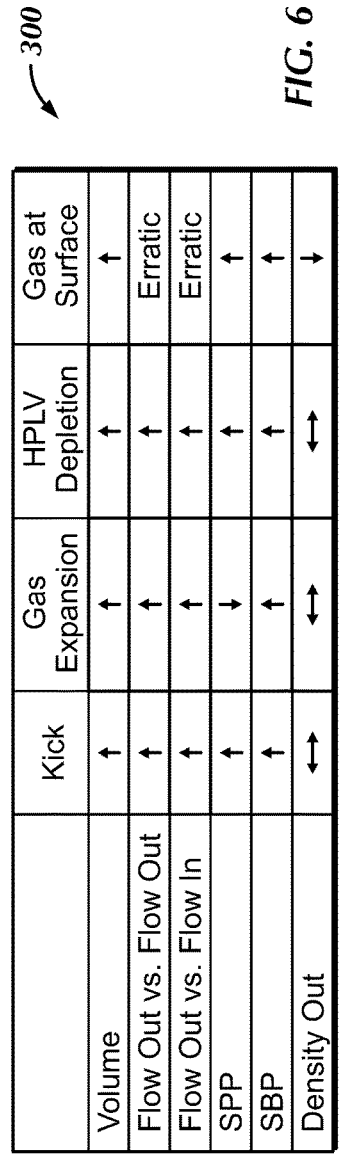

AUTOMATIC EVENT DETECTION AND CONTROL WHILE DRILLING IN CLOSED LOOP SYSTEMS

BACKGROUND

Flow of formation fluids into the wellbore during drilling operations is called an influx or "kick." By contrast, a fluid loss occurs when drilling fluid in the wellbore is lost to the formation, which can have a number of detrimental effects. If a kick cannot be detected and controlled fast enough, it can escalate into uncontrolled flow of formation fluids to the surface, which is called a "blow-out." Consequences from this may vary from operational delays (non-productive time) to more severe damage. Hydrostatic pressure is the first conventional barrier for controlling the well, and rig blow out preventers (BOP) are the second barrier.

For these reasons, early and accurate kick detection is critical during drilling operations to maintain proper hydrostatic pressure in the well. Warning signs that are conventionally looked for when detecting a kick are not always clear (ROP and hook load change), or the signs may arrive too late (change in cutting size, Chloride level, etc.). Sometimes, the frequency at which data is collected (standpipe pressure readings) may be too slow to properly detect a kick. Moreover, measurements of return flow (i.e., flow-out) of the well may be subject to uncertainties due to heave effects, mud transfers, and imprecision in tank level measurements.

So far, improved kick detection has been achieved by continuously monitoring the return flow (i.e., flow-out) in a closed-loop circulation system and comparing the flow-out to the flow-in. Several controlled pressure drilling techniques have been used to drill wellbores with such closed-loop drilling systems. In general, the controlled pressure drilling techniques include managed pressure drilling (MPD), underbalanced drilling (UBD), and air drilling (AD) operations.

In the Managed Pressure Drilling (MPD) technique, for example, the drilling system uses a closed and pressurizable mud-return system, a rotating control device (RCD), and a choke manifold to control the wellbore pressure during drilling. The various MPD techniques used in the industry allow operators to drill successfully in conditions where conventional technology simply will not work by allowing operators to manage the pressure in a controlled fashion during drilling.

As the bit drills through a formation, for example, pores become exposed and opened. As a result, formation fluids (i.e., gas) from an influx or kick can mix with the drilling mud. The drilling system then pumps this gas, drilling mud, and the formation cuttings back to the surface. As the gas rises up the borehole, the gas may expand, and hydrostatic pressure may decrease, meaning more gas from the formation may be able to enter the wellbore. If the hydrostatic pressure is less than the formation pressure, then even more gas can enter the wellbore.

As a primary function, managed pressure drilling attempts to control such kicks or influxes of fluid. This can be achieved using an automated choke response in the closed and pressurized circulating system made possible by the rotating control device. A control system controls the chokes with an automated response by monitoring the flow-in and the flow-out of the well, and software algorithms in the control system seek to maintain a mass flow balance. If a deviation from mass balance is identified, the control system initiates an automated choke response that changes the well's annular pressure profile and thereby changes the wellbore's equivalent mud weight. This automated capability of the control system allows the system to perform dynamic well control or constant bottom hole pressure (CBHP) techniques.

As an example, FIG. 1 shows an existing detection technique 100 in flow chart form for detecting a kick or influx during drilling with a closed-looped system. In the current technique 100, the system monitors parameters while drilling (Block 102). These monitored parameters typically include flow-in, flow-out, mud-weight levels, pit levels, pump pressure, surface leaks, trip-tank levels, etc. Using the monitored parameters, the system analyzes trends in the flow-out, standpipe pressure, and density (Decision 104) to determine whether an influx is detected (Block 110) or not.

In particular, the system monitors whether the flow-out has been increasing for a time interval (e.g., 15-seconds), whether the standpipe pressure has increased less than a first threshold (e.g., 5-psi), and whether the density has decreased less than a second threshold (e.g., 0.1-ppg). If not, the system determines whether flow-out is decreasing as a trend (Decision 106) and, if so, indicates that a loss is detected (Block 108). Otherwise, the system merely returns to monitoring (Block 102).

Should the system determine that the flow-out has been increasing for the time interval, the standpipe pressure has increased less than the first threshold, and the density has decreased less than the second threshold (yes at decision 104), then the system determines if an influx has been detected (Block 110). If an influx has been detected and if auto control features are enabled (Decision 112), then the system handles the influx by controlling and circulating out the detected kick (Block 114).

In the end, the detection technique 100 determines the state of a kick event or not based on the previous indications. In this sense, the technique 100 checks for the flow-out to increase as a trend line while the flow-in remains the same by averaging a last "n" number of readings to detect an influx. The "trend time" defined by the user directly changes the effectiveness of the detection technique. If the trend time is relatively small, the technique may be over-sensitive and may detect false kicks. If the trend time is relatively large, the system may not detect kicks because the technique 100 cannot sense the sudden increases in flow-out and SPP followed by a decrease indicative of a kick. Considering that various kicks come with different signatures, the dependability of the technique 100 for kick detection depends on how many false kicks will the operators tolerate during operation so that the system can still be able to detect true kicks properly.

As can be seen above, current kick detection methods compare parameters of the flow-in and flow-out of the well in conjunction with the standpipe pressure (SPP)'s behavior. As soon as the kick shows the expected characteristics, the current methods can successfully detect the kicks. However, in many cases, current methods do not detect various kicks because the characteristics of the kick may be different than expected, or the methods make false detections. As can be appreciated, any false kick detections are disconcerting. Further, any remedial steps required after a detect kick (even falsely) to close the well, make reports, stand down operations, and the like can be significant hurdles to the drilling progress. Therefore, operators want more reliability in kick detection and control.

According to additional problems, conventional kick detection techniques determine a kick by a volumetric change between flow-in and flow-out. However, the current techniques assume that the variables of interest, such as flow-in and flow-out, are steady-state, and unfortunately, volumetric changes are not always a good indicator of a fluid influx. For example, an increase in fluid in the drilling system may not always be due to an influx, even though it could be background gas. Moreover, current techniques assume that changes in pressure are instantaneous. In reality, pressure changes must propagate over time through the drilling system.

The subject matter of the present disclosure is directed to overcoming, or at least reducing the effects of, one or more of the problems set forth above.

SUMMARY

Controlled pressure drilling of a borehole with a drilling system detects events and identifies the events as being one of a gas-at-surface event, a kick event, a high-pressure low-volume depletion event, and a gas expansion event. Parameters including flow-in, flow-out, density, and standpipe pressure are monitored. A change is detected between the flow-in and flow-out, and an initiation point of the detected change is identified. At this point, an event from the initiation point is identified based on the monitored parameters from the initiation point. In response to the identified event, an action is initiated in the drilling system.

To detect the change between the flow-in and flow-out, a volume increase can be detected as a trend, which is indicative of a possible influx or similar event occurring in the wellbore. The action initiated is suited for such an influx or similar event that has been identified. If the detected changes is a volume loss, however, the action initiated can be different than used for an influx.

To identify a gas-at-surface event, for example, a decrease in density from the initiation point is detected. Otherwise, without the density decreasing, an event from the initiation point can be identified as being one of a kick event, a high-pressure low-volume depletion event, and a gas expansion event.

To identify a kick event, for example, the standpipe pressure is determined to have increased from the initiation point without the density decreasing since the initiation point, and a cumulative volume value from the initiation point is determined to be above a first threshold.

To identify a high-pressure low-volume depletion event, for example, the standpipe pressure is determined to have increased from the initiation point without the density decreasing since the initiation point, and a flow balance is determined to exist from the initiation point. To identify a gas expansion event, for example, the standpipe pressure is determined to have decreased from the initiation point without the density decreasing since the initiation point.

The foregoing summary is not intended to summarize each potential embodiment or every aspect of the present disclosure.

BRIEF DESCRIPTION OF THE DRAWINGS

FIG. 5 diagrams flow-in and flow-out during a loss event, a kick event, a high-pressure low-volume depletion (HPLVD) event, a gas expansion event, and a gas-at-surface event relative to standpipe pressure (SPP) changes.

FIG. 6 tabulates trends of volume, flow-out, flow-in, standpipe pressure (SPP), surface backpressure (SBP), and density-out for different types of events.

DETAILED DESCRIPTION

A. System Overview

Figure 1:
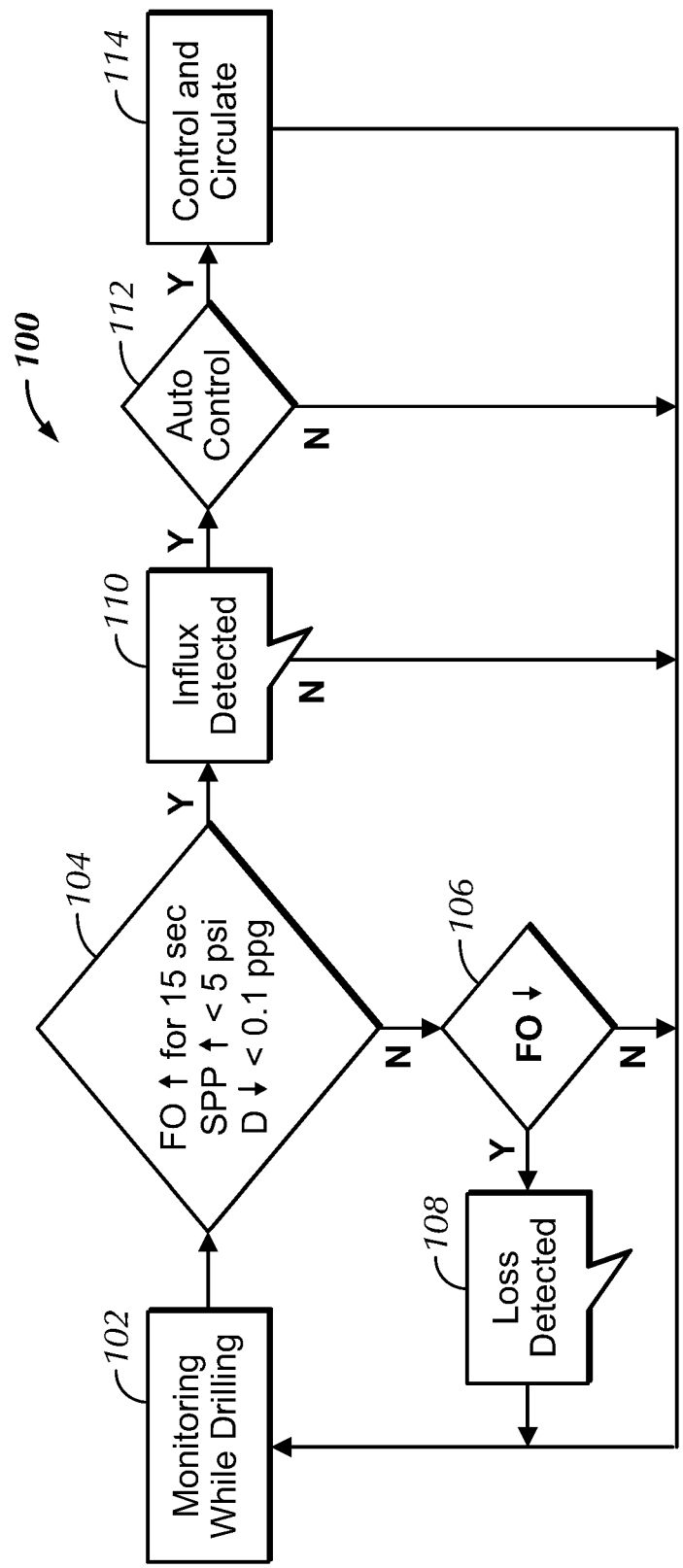
FIG. 1 illustrates an existing kick detection technique according to the prior art in flow chart form.
Figure 2:
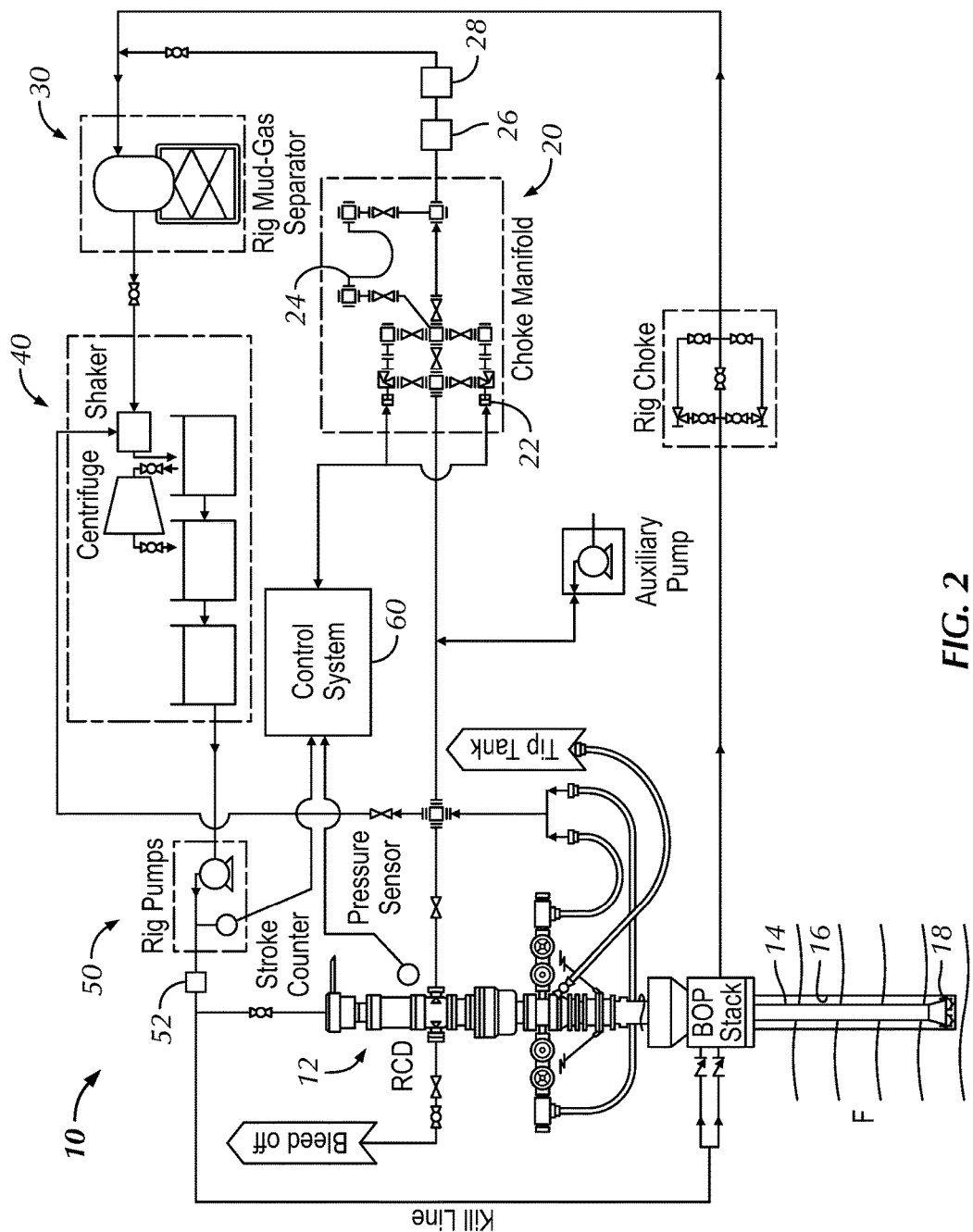
FIG. 2 illustrates a controlled pressure drilling system having a control system according to the present disclosure.

FIG. 2 shows a closed-loop drilling system 10 according to the present disclosure for controlled pressure drilling. As shown and discussed herein, this system 10 can be a Managed Pressure Drilling (MPD) system and, more particularly, a Constant Bottomhole Pressure (CBHP) form of MPD system. Although discussed in this context, the teachings of the present disclosure can apply equally to other types of controlled pressure drilling systems, such as other MPD systems (Pressurized Mud-Cap Drilling, Returns-Flow-Control Drilling, Dual Gradient Drilling, etc.) as well as to Underbalanced Drilling (UBD) systems, as will be appreciated by one skilled in the art having the benefit of the present disclosure.

The drilling system 10 has a rotating control device (RCD) 12 from which a drill string 14, a bottom hole assembly (BHA), and a drill bit 18 extend downhole in a wellbore 16 through a formation F. The rotating control device 12 can include any suitable pressure containment device that keeps the wellbore in a closed-loop at all times while the wellbore 16 is being drilled. As such, the rotating control device (RCD) 12 atop the BOP contains and diverts annular drilling returns, and it also completes the circulating system to create the closed-loop of incompressible drilling fluid.

The system 10 also includes mud pumps 50, a standpipe (not shown), mud tanks 40, a mud gas separator 30, and various flow lines, as well as other conventional components. In addition to these, the drilling system 10 includes an automated choke manifold 20 that is incorporated into the other components of the system 10.

Finally, a control system 60 of the drilling system 10 integrates hardware, software, and applications across the drilling system 10 and is used for monitoring, measuring, and controlling parameters in the drilling system 10. In this contained environment of the closed-loop system 10, for example, minute wellbore influxes or losses are detectable at the surface, and the control system 60 can further analyze pressure and flow data to detect kicks, losses, and other events. In turn, at least some operations of the drilling system 10 can be automatically handled by the control system 60.

To monitor operations, the control system 60 can uses data from a number of sensors and devices in the system 10. For example, one or more sensors can measure pressure in the standpipe. One or more sensors (i.e., stroke counters) can measure the speed of the mud pumps 50 for deriving the flow rate of drilling fluid into the drillstring 14. In this way, flow into the drillstring may be determined from strokes-per-minute and/or standpipe pressure. Preferably, a flowmeter 52, such as a Coriolis flowmeter after the pumps 50, can be used to measure flow-in to the wellbore, as detailed later.

One or more sensors can measure the volume of fluid in the mud tanks 40 and can measure the rate of flow into and out of mud tanks 40. In turn, because a change in mud tank level can indicate a change in drilling fluid volume, flow-out of the wellbore may be determined from the volume entering the mud tanks 40.

Rather than relying on conventional pit level measurements, paddle movements, and the like, the system 10 can use mud logging equipment and flowmeters to improve the accuracy of detection. For example, the system 10 preferably has a flowmeter 24, such as a Coriolis mass flowmeter, on the choke manifold 20 to capture fluid data—including mass and volume flow, mud weight (i.e., density), and temperature—from the returning annular fluids in real-time, at a sample rate of several times per second. Because the Coriolis flowmeter 24 gives a direct mass rate measurement, the flowmeter 24 can measure gas, liquid, or slurry. Other sensors can be used, such as ultrasonic Doppler flowmeters, SONAR flowmeters, magnetic flowmeter, rolling flowmeter, paddle meters, etc.

Additional sensors can measure mud gas, flow line temperature, mud density, and other parameters. For example, a flow sensor can measure a change in drilling fluid volume in the well. Also, a gas trap, such as an agitation gas trap, can monitor hydrocarbons in the drilling mud at surface. To determine the gas content of drilling mud, for example, the gas trap mechanically agitates mud flowing in a tank. The agitation releases entrained gases from the mud, and the released gases are drawn-off for analysis. The spent mud is simply returned to the tank 40 to be reused in the drilling system 10.

The fluid data and other measurements noted herein can be transmitted to the control system 60, which can in turn operate drilling functions. In particular, the control system 60 can operate the automated choke manifold 20, which manages pressure and flow during drilling and is incorporated into the drilling system 10 downstream from the rotating control device 12 and upstream from the gas separator 30. Among other components, the manifold 20 has chokes 22, the flowmeter 24, pressure sensors (not shown), a local controller (not shown) to control operation of the manifold 20, and a hydraulic power unit (not shown) and/or electric motor to actuate the chokes 22. The control system 60 is communicatively coupled to the manifold 20 and has a control panel with a user interface and processing capabilities to monitor and control the manifold 20.

In addition to the choke manifold 20, devices, and sensors noted above, the drilling system 10 can include a continuous flow system (not shown), a gas evaluation device 26, a multi-phase flowmeter 28, and other components incorporated into the components of the system 10. The continuous flow system allows flow to be maintained while standpipe connections are being made, and the drilling system 10 may or may not include such components. For its part, the gas evaluation device 26 can be used for evaluating fluids in the drilling mud, such as evaluating hydrocarbons (e.g., C1 to C10 or higher), non-hydrocarbon gases, carbon dioxide, nitrogen, aromatic hydrocarbons (e.g., benzene, toluene, ethyl benzene and xylene), or other gases or fluids of interest in drilling fluid. Accordingly, the device 26 can include a gas extraction device that uses a semi-permeable membrane to extract gas from the drilling mud for analysis.

The multi-phase flowmeter 28 can be installed in the flow line to assist in determining the make-up of the fluid. As will be appreciated, the multi-phase flow meter 28 can help model the flow in the drilling mud and provide quantitative results to refine the calculation of the gas concentration in the drilling mud.

During operations, the system 10 uses the rotating control device 12 to keep the well closed to atmospheric conditions. Fluid leaving the wellbore 16 flows through the automated choke manifold 20, which measures return flow (e.g., flow-out) and density using the flowmeter 24 installed in line with the chokes 22. Software components of the control system 60 then compare the flow rate in and out of the wellbore 16, the injection pressure (or standpipe pressure), the surface backpressure (measured upstream from the drilling chokes 22), the position of the chokes 22, and the mud density, among other possible variables. Comparing these variables, the control system 60 then identifies minute downhole influxes and losses on a real-time basis to manage the annulus pressure during drilling.

By identifying the downhole influxes and losses during drilling, for example, the control system 60 monitors circulation to maintain balanced flow for constant BHP under operating conditions and to detect kicks and lost circulation events that jeopardize that balance. The drilling fluid is continuously circulated through the system 10, choke manifold 20, and the Coriolis flowmeter 24. As will be appreciated, the flow values may fluctuate during normal operations due to noise, sensor errors, etc. so that the system 60 can be calibrated to accommodate such fluctuations. In any event, the system 60 measures the flow-in and flow-out of the well and detects variations. In general, if the flow-out is higher than the flow-in, then fluid is being gained in the system 10, indicating a kick. By contrast, if the flow-out is lower than the flow-in, then drilling fluid is being lost to the formation, indicating lost circulation.

To then control pressure, the control system 60 introduces pressure and flow changes to the incompressible circuit of fluid at the surface to change the annular pressure profile in the wellbore 16. In particular, using the choke manifold 20 to apply surface backpressure within the closed loop, the control system 60 can produce a reciprocal change in bottomhole pressure. In this way, the control system 60 uses real-time flow and pressure data and manipulates the annular backpressure to manage wellbore influxes and losses.

To do this, the control system 60 uses internal algorithms to identify what event is occurring downhole and can react automatically. For example, the control system 60 monitors for any deviations in values during drilling operations, and alerts the operators of any problems that might be caused by a fluid influx into the wellbore 16 from the formation F or a loss of drilling mud into the formation F. In addition, the control system 60 can automatically detect, control, and circulate out such influxes and losses by operating the chokes 22 on the choke manifold 20 and performing other automated operations.

A change between the flow-in and the flow-out can involve various types of differences, relationships, decreases, increases, etc. between the flow-in and the flow-out. For example, flow-out may increase/decrease while flow-in is maintained; flow-in may increase/decrease while flow-out is maintained, or both flow-in and flow-out may increase/decrease. See FIGS. 3A-3H and FIG. 5 below.

In general, a possible fluid influx or "kick" can be noted when the "flow-out" value (measured from the flowmeter 24) deviates from the "flow-in" value (measured from the flowmeter 52 or the stroke counters of the mud pumps 50). As is known, a "kick" is the entry of formation fluid into the wellbore 16 during drilling operations. The kick occurs because the pressure exerted by the column of drilling fluid is not great enough to overcome the pressure exerted by the fluids in the formation being drilled.

As will be described in more detail later, the kick is detected when the well's flow-out is significantly greater than the flow-in for a specified period of time. Additionally, the standpipe pressure (SPP) does not increase beyond a defined maximum allowable SPP increase, and the density-out of fluid out of the well does not drop more than a surface gas density threshold. When a kick is detected, an alert can notify the operator, and the system 60 can then control the influx.

In the control system 60, the kick control can be an automated function that combines kick detection and control as discussed later, and the control system 60 can base its kick control algorithm on the modified drillers' method to manage kicks. In a form of auto kick control, for example, the control system 60 automatically closes the chokes 22 to increase surface backpressure in the wellbore annulus 16 until mass balance is established and the influx stops.

In operating the chokes 22, the system 60 adds a predefined amount of pressure as a buffer and circulates the influx out of the well by controlling the standpipe pressure. The standpipe pressure will be maintained constant by automatically adjusting the surface backpressure, thereby increasing the downhole circulating pressure and avoiding a secondary influx. The kick fluid will be moving up in the annulus with full pump speed using a small decreased relative flow rate of about −0.1 gpm to safely bring the formation pressure to balance. During this process, a conceptualized trip tank can be monitored for surface fluid volume changes because conventional pit gain measurements are usually not very precise. This can all be monitored and displayed on the control system 60 to offer additional control of these steps.

Once the flow-out and flow-in difference is brought under control, the control system 60 will maintain this equilibrium for a specified time before switching to the next mode. In a successful operation, the kick detection and control cycle can be expected to be managed in roughly two minutes.

On the other hand, a possible fluid loss can be noted when the "flow-in" value (measured from the stroke counters of the pumps 50 or inlet flowmeter 52) is greater than the "flow-out" value (measured by the flowmeter 24). As is known, fluid loss is the loss of whole drilling fluid, slurry, or treatment fluid containing solid particles into the formation matrix. The resulting buildup of solid material or filter cake may be undesirable, as may be any penetration of filtrate through the formation, in addition to the sudden loss of hydrostatic pressure due to rapid loss of fluid.

Similar steps as those given above, but suited for fluid loss, can then be implemented by the control system 60 to manage the pressure and flow during drilling in this situation. In general, higher density mud, loss control materials (LCM), and the like may be pumped into the wellbore 16, and other remedial measures can be taken. For example, the operator can initiate pumping new mud with the recommended or selected kill mud weight. As the kill mud starts to go down the wellbore 16, the chokes 22 are opened up gradually approaching a snap position as the kill mud circulates back up to the surface. Once the kill mud turns the bit 18, the control system 60 again switches back to the standpipe pressure (SPP) control until the kill mud circulates all the way back up to the surface.

B. Kick Events

During drilling, the surface parameters change depending on the formation deliverability, kick intensity, and drilling parameters. Thus, several types of kicks are defined herein for detection and control by the disclosed system 10. In particular, FIGS. 3A to 3H show examples of various kick events for detection and control by the disclosed system 10.

Figure 3A:
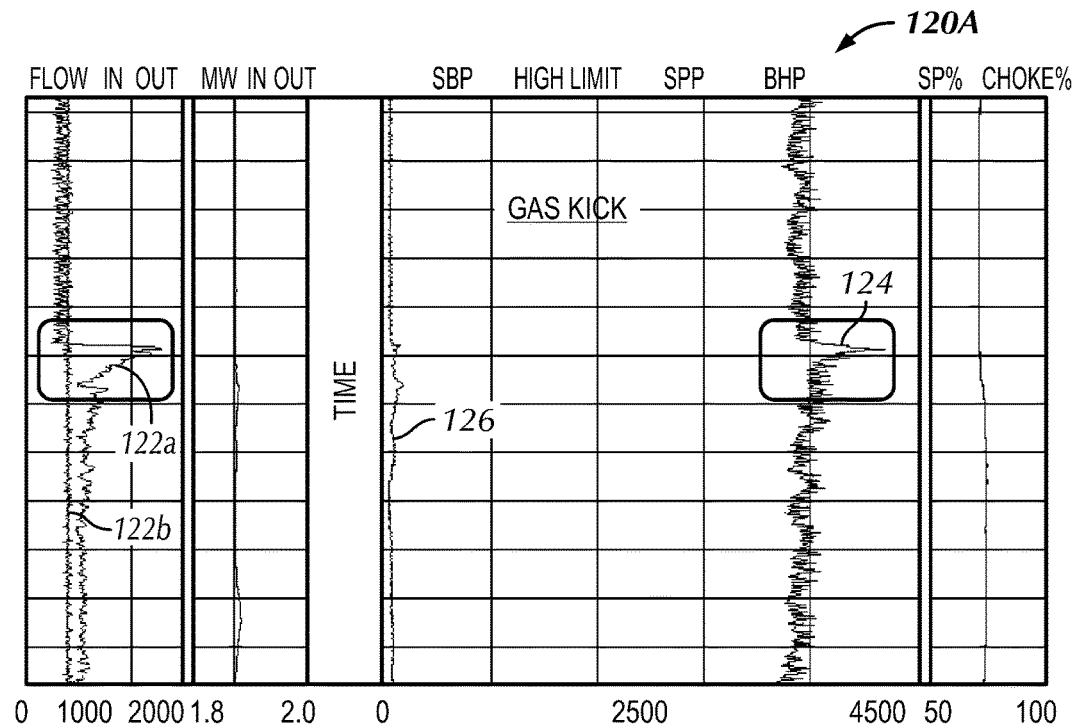
FIGS. 3A-3H illustrates examples of various kick events for detection according to the present disclosure.

Characteristics of a gas kick are shown in the graph 120A of FIG. 3A. This type of kick cannot be detected by existing detection techniques even though the "flow-out" value 122a is increasing while the "flow-in" value 122b is constant. The kick can be confirmed by the approximate 300-psi spike in the Stand Pipe Pressure (SPP) reading 124, and further indication can be noted by the slight change in SBP 126. However, any of the current kick detection techniques that look for a continuously increasing trend of the "flow-out" value 122a changing over time may not detect this event. In other words, because the increase in the "flow-out" value 122a in this kick event was initially sudden and followed by a decrease, for example, this type of gas kick may not be properly detected by current techniques. However, the detection techniques disclosed herein are expected to detect this type of event.

Figure 3B:
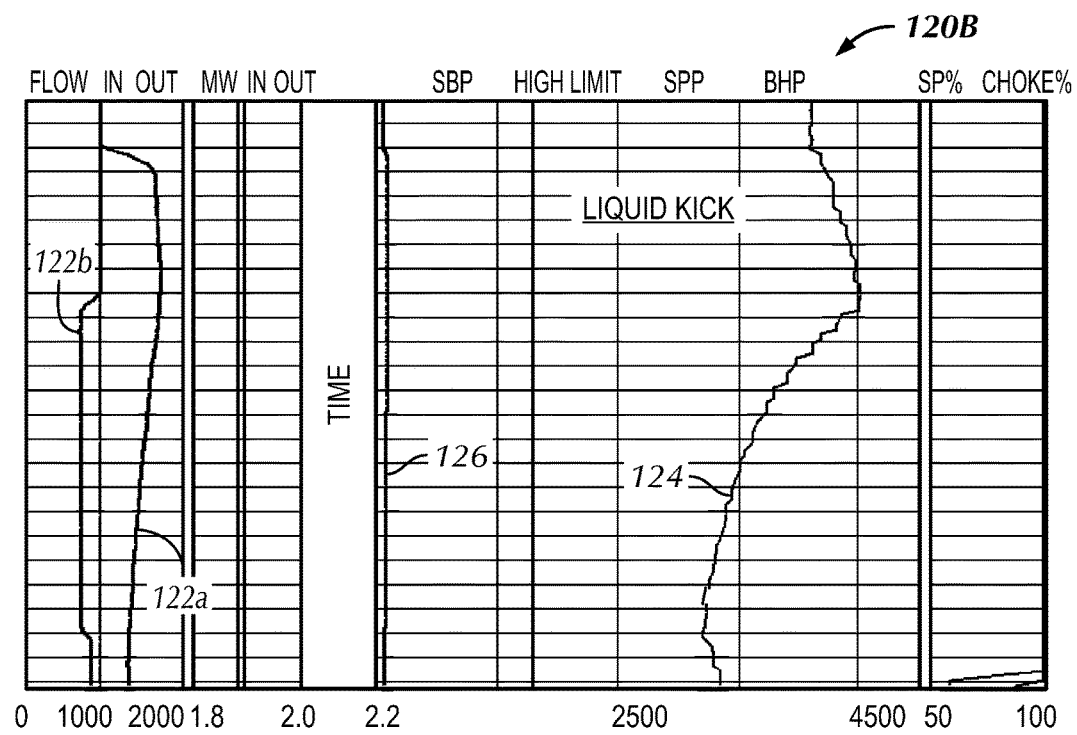

In contrast to the gas kick, FIG. 3B shows a graph 120B of a liquid or water kick event. Current kick detection techniques can detect this type of kick based on the simultaneous increase in the "flow-out" value 122a and the SPP reading 124. In addition, the surface backpressure (SBP) reading 126 shows a detectable increase when the kick fluid is introduced to the annulus. As the kick fluid continues to enter the annulus, the kick produces a continuous decrease in SPP reading 124 caused by the reduction in the overall annulus hydrostatic. The rate that the SPP reading 124 and the "flow-out" value 122a increase indirectly indicates the intensity of the kick and the formation deliverability. As expected, the detection techniques disclosed herein are expected to detect this type of liquid kick.

Figure 3C:
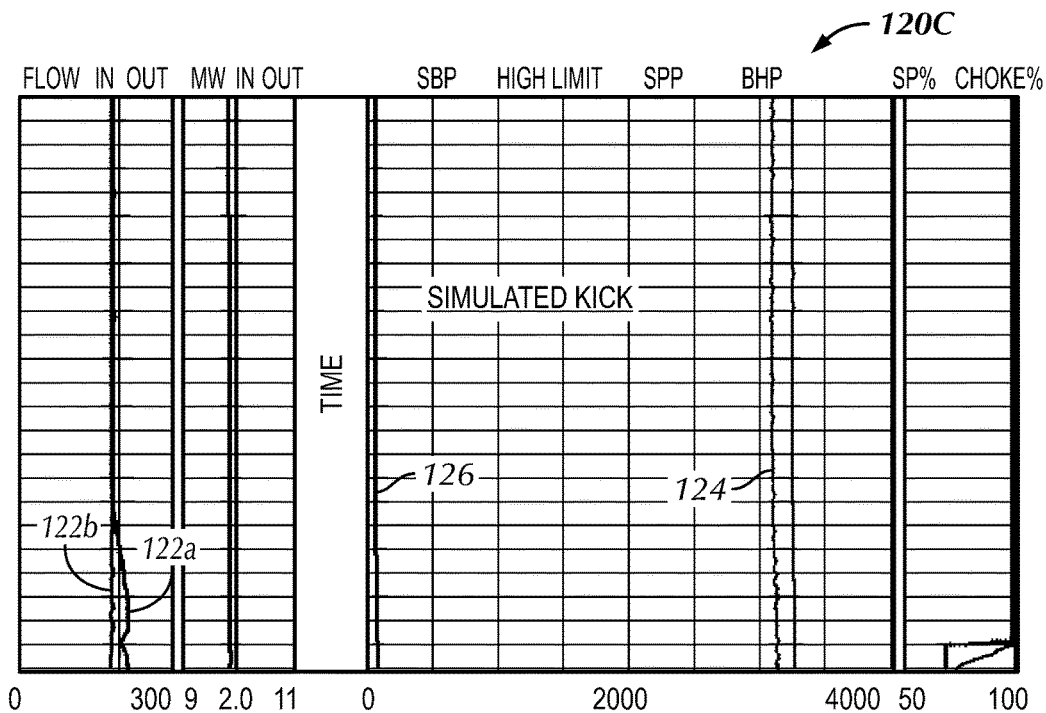

FIG. 3C shows a graph 120C of a simulated kick performed by gas injection in a test well. In this simulated kick, gas has been injected through a parasite string into a 6,000-ft vertical well. Due to the limitation in the gas injection pressure, the test loop is able to only simulate low intensity kicks. The increase in the "flow-out" value 122a is slow, and the increases in the SPP reading 124 and the SBP reading 126 are barely noticeable. This signature perfectly meets the detection requirements of current techniques and helps explain why current techniques are not adequate. During real drilling operations, for instance, this kind of behavior in FIG. 3C is never really observed for a gas kick event. However, the detection techniques disclosed herein are expected to better detect gas kick events.

Figure 3D:
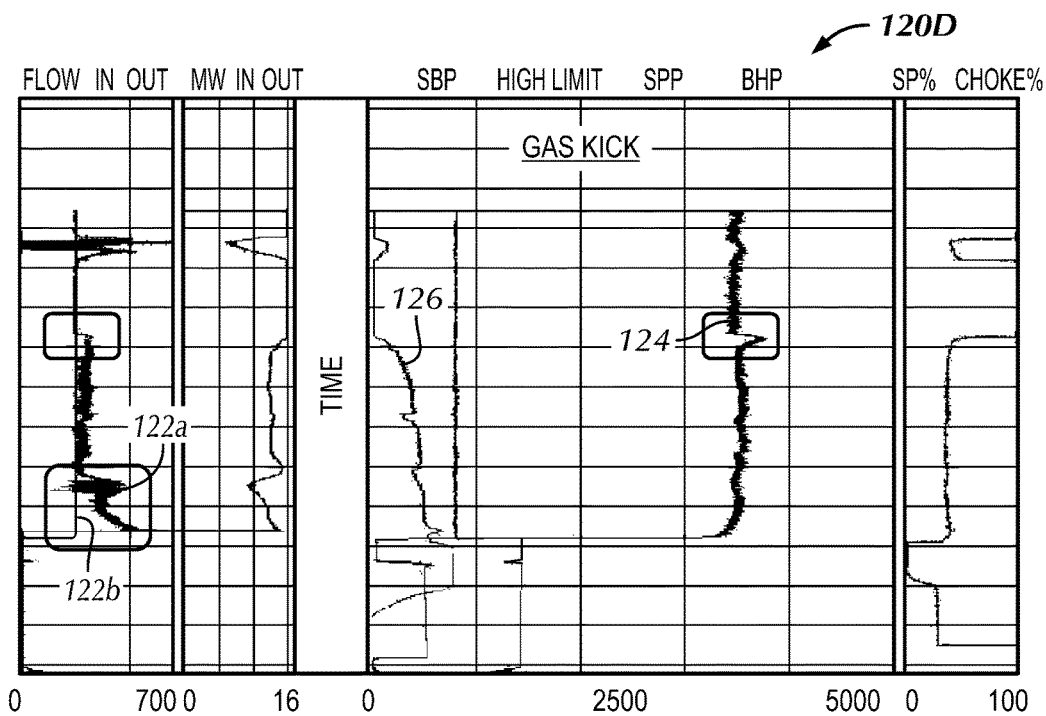

FIG. 3D shows a graph 120D of a gas kick event followed by expansion from unconventional gas shale (i.e., micro-fractured shale formation). A sharp increase in the "flow-out" value 122a and an initial spike in the SPP reading 124 clearly indicated a kick. In this example, this kick was controlled by the system manually. Control took almost 30-min, and at the end of the process, the SBP reading 126 reached 90% of the MAASBP (Maximum Allowable Annular Surface Back Pressure). Therefore, the well was shut in with the rig BOP. Although the formation characteristics of micro-fractured gas shale is distinctly different than a producing reservoir with high permeability, the kick signature was still identical. It is also noted that a sudden gas expansion occurs while formation gas is close to surface.

Figure 3E:
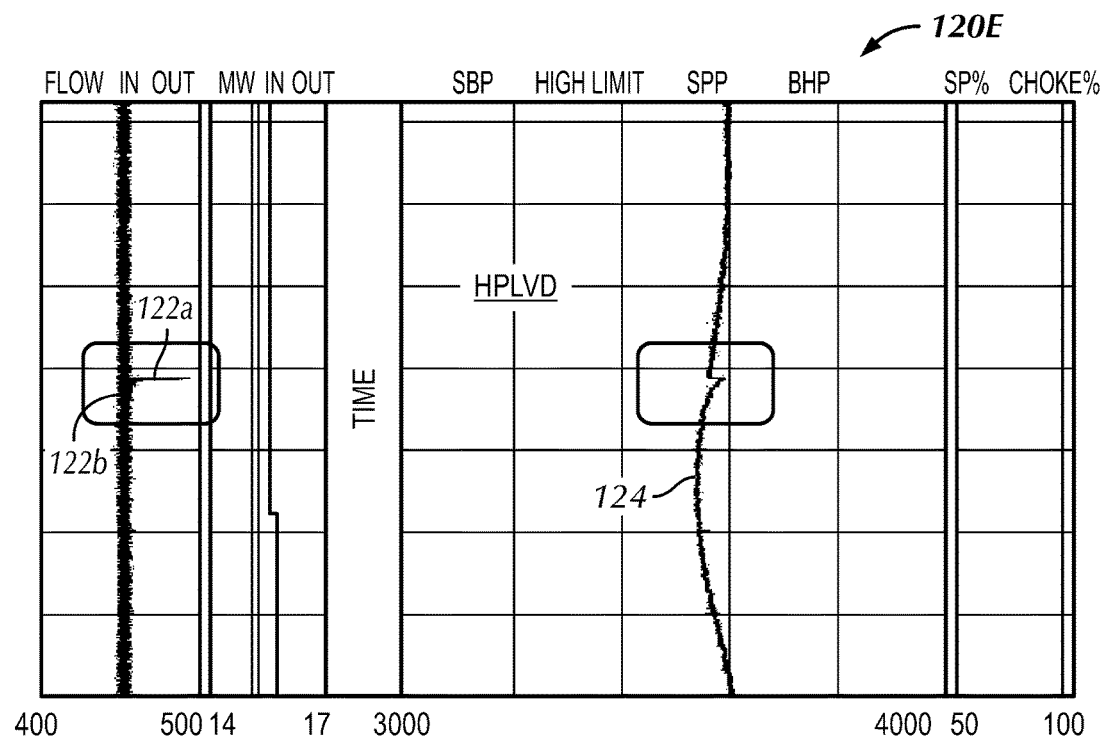

FIG. 3E shows a graph 120E of another form of a kick related to a High Pressure Low Volume Depletion (HPLVD). Similar to standard kick behavior, this event comes into the wellbore aggressively and then loses its momentum quickly. Changes in the "flow-out" value 122a and the SPP reading 124 are very similar to a standard kick, but the "flow-out"

value 122a goes back to an original steady position, which indicates that formation fluid is not flowing into the wellbore anymore.

Since the total volume of the kick fluid is significantly small and it already depletes itself, the system 10 does not necessarily need to react to this type of kick situation. Thus, identifying this event properly can save valuable time so the system does not start reacting to it. Moreover, in many cases, this type of event can be an early indication of a potential kick. Therefore, being able to detect this type of event can prepare operators for a real kick to follow. To that end, the detection techniques disclosed herein are expected to detect this type of event.

Based on the actual volume at the bottom hole conditions, based on the content of the formation fluid (if it is gas), and depending at depths close to surface (<500 ft) on the back pressure applied, the event will expand and show a certain signature while passing through the flowmeter (e.g., 24: FIG. 2). Gas volume also dictates the amount of potential pressure drop in the annulus due to expansion. If the event is considered not bearable, additional pressure should be provided to compensate for difference to maintain BHP (Bottom Hole Pressure).

Figure 3F:
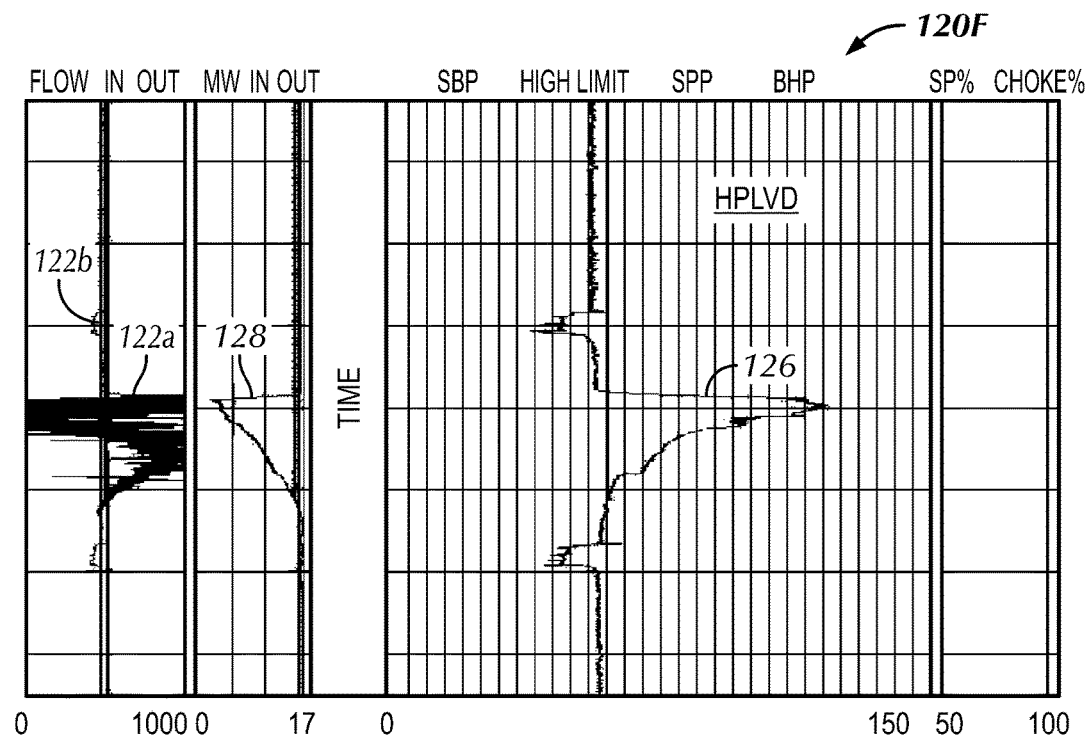

When the HPLVD gas reaches surface, the HPLVD gas event (FIG. 3E) dramatically expands. For example, FIG. 3F shows a graph 120F of the expansion of the HPLVD gas event at surface through the flowmeter (24). The signature resembles what happens at bottom hole in larger scale: initially the flow oscillation 122a is relatively great, density 128 drops sharply, and a quick spike in pressure 124 is recorded. Then, in all three parameters, a recovery is observed indicating decreasing gas content in the mud. Therefore, formation gas caused by the initial pressure difference gets into the drilling mud very quickly at the very beginning, and then it loses its pressure quickly and slows down because of its small volume. Finally, once formation pressure is depleted, the kick stops by itself. Note that the circulation of a few seconds of a kick took approximately 8-min of gas circulation at surface.

Figure 3G:
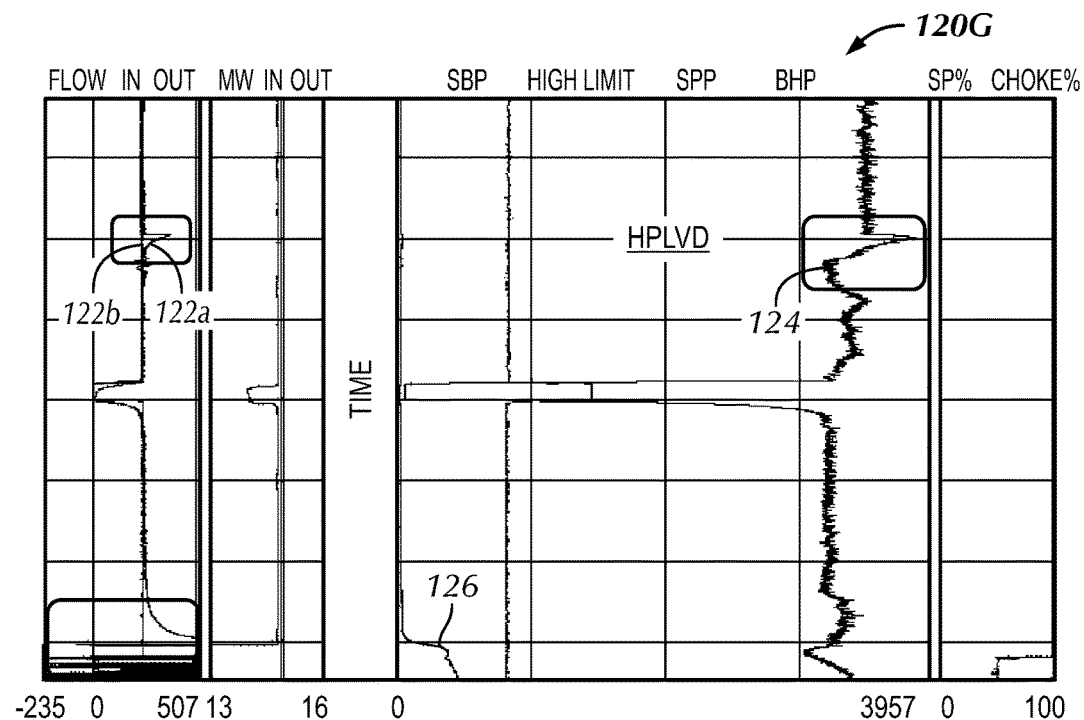

Another HPLVD event is shown in a graph 120G of FIG. 3G. Compared to the event shown in FIG. 3E, this event is larger in size. At the same 60-min time scale, this event has a triangular or ramped response, whereas the previous event was more linear. At the bottom side of the graph, the volume difference can be confirmed with the behavior of the flow-out value 122a once gas has hit to surface. Oscillations recorded are much bigger in magnitude, and it takes more than 45-min to clear this gas out. Since expansion is causing the drop in BHP, the system can apply SBP to keep the SPP value 124 and BHP constant at the previous stabilized level until all gas is out of the well. It can be noted that flow-out value 122a is exponentially increasing and the stand pipe pressure reading 124 is going down during gas expansion similar to FIG. 3D.

Figure 3H:
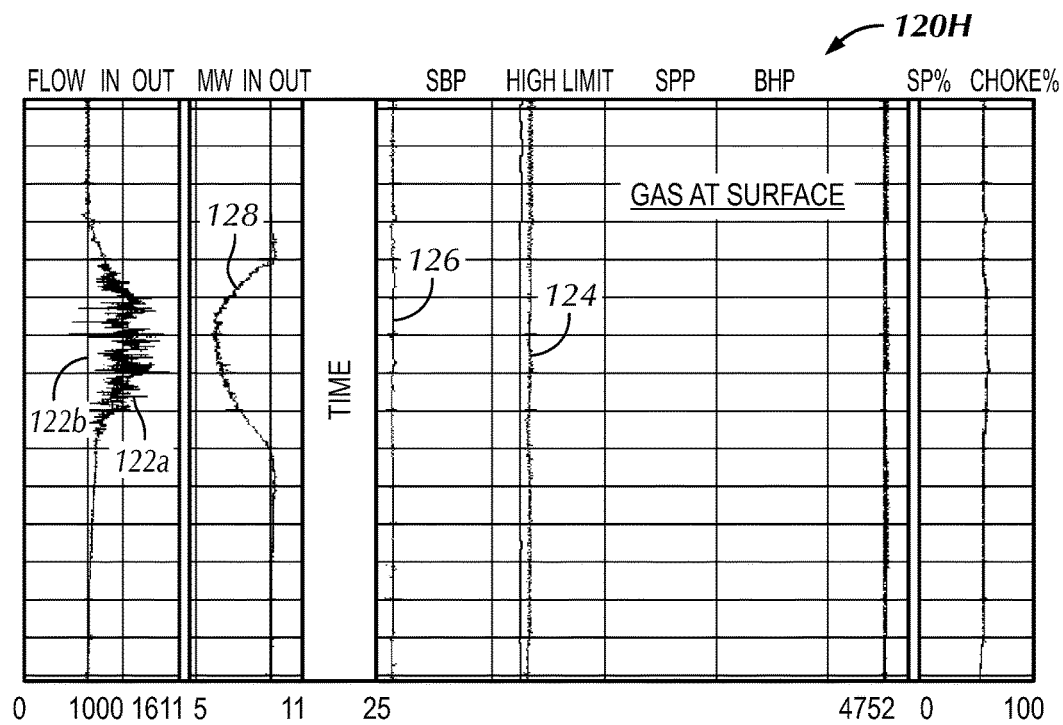

FIG. 3H shows a graph 120H of an event from gas-at-surface (e.g., when air trapped in the drillstring comes to the surface). A significantly small amount of air is trapped in one of the stands during connection and filling up process. Once it is circulated down and back to the surface, an increase in the flow-out value 122a and a drop in density 128 are observed. The curvy signature indicates that gas (air in this case) is well distributed. The total clearing time (4-min) shows that the gas' volume is negligible (note that in FIG. 3F both flow-out reading 122a and the density 128 shows a sharp initial change). The detection techniques disclosed herein are also expected to detect this type of event.

C. Process Overview

Figure 4:
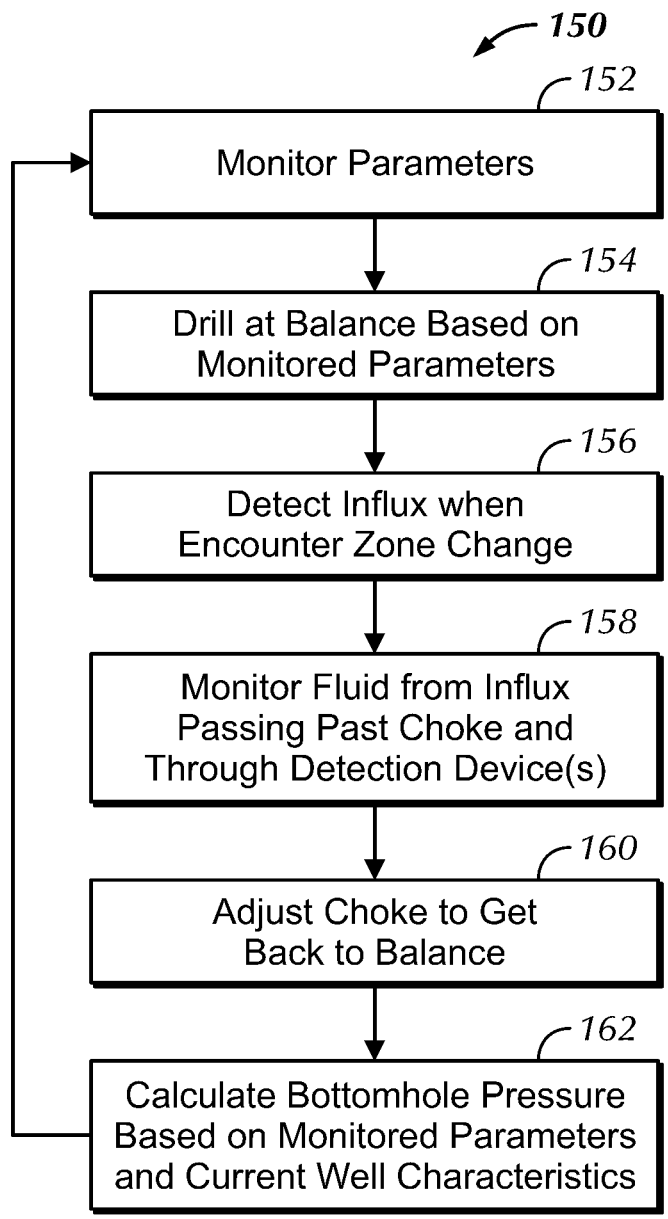
FIG. 4 illustrates a process for closed-loop drilling according to the present disclosure.

With an understanding of the system 10 and the types of events to be detected and controlled, discussion now turns to a process 150 in FIG. 4 for closed-loop drilling according to the present disclosure. During the drilling operation, the control system 60 monitors the several parameters of interest (Block 152). As noted previously, these parameters include the flow-in and flow-out of the wellbore 16, the injection pressure (or standpipe pressure), the surface backpressure (measured upstream from the drilling chokes 22), the position of the chokes 22, and the mud density, among other parameters useful for MPD or other controlled pressure drilling operations. Based on these monitored parameters, the control system 60 can identify minute downhole influxes and losses on a real-time basis and can manage pressure to drill the wellbore "at balance" (Block 154). Eventually, the control system 60 detects an influx when a change in a formation zone is encountered (Block 156). As detailed herein, the change can involve any of a number of possibilities, including reaching a zone in the formation with a higher formation pressure, for example.

With the detected influx, the control system 60 automatically adjusts the chokes 22 on the manifold 20 to achieve balance again for managed pressure drilling (Block 160). As discussed above, the choke manifold 20 is disposed downstream from the rotating control device 12 and controls the surface backpressure in the well 16 by adjusting the flow of drilling mud out of the well from the rotating control device 12 to the gas separator 30.

Typically, various micro-adjustments are calculated and made to the choke 22 throughout the drilling process as the various operating parameters continually change. From the adjustments, the control system 60 can determine the bottomhole pressure at the current zone of the formation, taking into account the current drilling depth, the equivalent mud weight, the static head, and other variables necessary for the calculation (Block 162).

Concurrent with the operation of the manifold 20 and its adjustments, detection devices (e.g., the Coriolis flowmeter 24, the gas evaluation device 28, etc.) monitor the drilling mud passing from the manifold 20 through the flow line (Block 158). Eventually, after some calculated lag time that depends on the flow rate and the current depth of the well, the actual fluid from the formation causing the influx will reach the device 24/28. This lag time can be directly determined based on the known flow rates, depth of the wellbore, location of the zone causing the influx, etc. Operating as disclosed herein, the device 24/28 then directly determines characteristics of the drilling mud passing through or by the device 24/28.

As noted previously, the Coriolis flowmeter 24 can measure mass and volume flow, mud weight (i.e., density), and temperature in the returning annular fluids in real-time, at a sample rate of several times per second. As is well known, the volumetric flow rate of the drilling mud will be its mass flow rate divided by the mud's density. Here, the density of the mud is constantly changing due to changes in temperature, pressure, compositional make-up of the mud (i.e., gas concentration), and phase of the fluid content (i.e., free gas or dissolved gas content). All of these monitored parameters can be taken into account in the calculations of the volume of the influx, the flow rates, and the like.

The gas evaluation device 28 can determine the hydrocarbon gas content of the drilling mud. In this case, the gas evaluation device 28 can be calibrated for the particular drilling mud used in the system 10, and any suitable type of drilling mud could be used in the system 10. To obtain a delta reading, an auxiliary gas evaluation device (not shown)

can be installed on the system 10 in the flow of drilling mud into the well (from the tanks or the mud pumps) to determine the initial gas content of the drilling mud flowing into the well. This value can then be subtracted from the reading by the device 28 taken downstream from the drilling mud flowing from the rotating control device 12. From this, a determination can be made as to what portion of the gas content is due to the influx encountered in the well.

In the calculated adjustments for the choke 22 that take into account the current drilling depth, the equivalent mud weight, the static head, and other variables necessary (Block 160), the control system 60 detects kicks or other events while drilling in the closed-loop system. To do this, the control system 60 quantitatively processes dynamically measured drilling parameters preferably at time intervals (1-4 times/sec). The dynamically measured parameters include: Standpipe Pressure (SPP), flow-out, mud density-out, and flow-in.

Processing these parameters, the control system 60 detects kicks as well as high pressure-low volume depletions and further determines whether a characteristic SPP behavior is occurring. This characteristic SPP behavior can be summarized as an initial pressure increase followed by a decreasing pressure trend during a kick initiation while flow is presented. After finding such characteristic behavior, the control system 60 filters out common false kick cases, such as background gas-at-surface and volumetric changes due to mud compression/decompression when surface pressure is changed.

To distinguish between the various events of kick, high-pressure low-volume depletion (HPLVD), a gas expansion, and gas-at-surface, the control system 60 uses an algorithm as discussed below that combines flow trend analysis with sensitive volumetric gain measurement in conjunction with SPP trend analysis. This combination can improve detection accuracy of the events. The algorithm preferably uses frequent data collection (60-240 datapoints/min versus the more conventional 1-4 datapoints/min), measures pressure with high precision (+/−1 psi), and measures flow with the Coriolis flowmeter 24. These steps help identify events with higher resolution.

Additionally, common false detections are filtered out by means of continuous density-out monitoring through the closed-loop circulation system 10. Finally, the algorithm of the control system 60 can automate the entire detection process, eliminating the need for human intervention.

D. Influx Detection

As noted above, volumetric changes are not necessarily a good indicator of a fluid influx. However, further variables, such as pressure out, density-out, bottomhole pressure, etc., in combination with volumetric changes can help distinguish what volumetric changes are due to a "true" influx. Accordingly, the control system 60 identifies signature changes over time to classify them to determine if an influx is occurring. To do this, the control system 60 looks at flow-out over time along with volume differences and also calculates an integrated volume.

Moreover, the control system 60 monitors changes in standpipe pressure SPP. During dynamic drilling conditions, the standpipe pressure SPP is the sum of the pressure loss of the entire system (e.g., due to pressure losses in the drill string, in the bottomhole assembly, across the drill bit, and in the annulus). The SPP drops when there is a kick because the influx of the kick is lighter than the mud and the backpressure on the system 10 decreases. The change in SPP is a long term effect that appears over time. Thus, the control system 60 preferably looks at SPP at increased intervals.

For example, an initial kick of 30 to 50-psi will register as a 2 to 3-sec event in the SPP readings. This is a strong sign of a kick. Long term SPP decreases at times greater than what it takes for a pressure pulse to travel the wellbore 16. Moreover, SPP gives a good reading because there is a clean fluid column in the standpipe without cuttings, etc.

As noted above, the control system 60 improves kick detection by being able to detect several types of events that are not currently detectable with existing techniques. To achieve this, the kick detection technique of the control system 60 monitors for changes in additional parameters from volume and SBP (Surface Back Pressure). Volume is now considered directly instead of flow-out increasing as a trend in the disclosed detection algorithm.

Differing from the existing detection techniques, the system's influx detection can use trend analysis and noise filtering functionalities. Further, gas expansion, gas-at-surface, and high pressure low volume depletion (HPLVD) events are distinguished from kick events so that the control system 60 can initiate automated reactions that fit to the type of event. With these improvements, false alarms can be reduced, and the certainty of the kick detection can be significantly improved.

Differences exist between a gas kick vs. a liquid kick, Hydrocarbon gas in Oil Based Mud vs. Water Based Mud, high intensity kicks vs. low intensity kicks, and the like. These differences equate to certain signatures with some changes that happen in brief time periods as small as a couple of seconds. Therefore, for successful kick detection, the control system 60 preferably does not use a user-selected "trend time" for the system's detection. Based on the kick content, mud type, and formation properties, the signature of the kick and how the kick develops over time can vary, which makes a user-selected trend time less suited for the analysis.

In fact, formation deliverability and kick intensity are two important parameters controlling the flow-out response at the surface. Defining a detection time cancels out the possibility to understand quick spikes and limits detection in the first place. For these reasons, events are preferably not detected with the control system 60 in the "trend time" of a user-defined time period.

Finally, the control system 60 also includes additional detection parameters to improve the accuracy of the detection algorithm. For example, the control system 60 uses "volume" and "SBP" as additional kick detection parameters. Even though SPP may be the primary pressure input for detection by the control system 60, following how SBP is changing against SPP can provide increased certainty. Additionally, volume increase trends on top of flow trends can help separate pump efficiency problems from kick events, and a minimum threshold can eliminate unwanted reactions caused by small temporary changes due to pipe movements, etc.

Before explaining the event detection and control technique of the control system 60, discussion first turns to some characteristics and parameters of interest for the control system 60 to detect and identify the various events encountered.

For illustrative purposes, FIG. 5 diagrams flow-in and flow-out during a loss event 210, a kick event 220, a high-pressure low-volume depletion (HPLVD) event 230, a gas expansion event 240, and a gas at surface event 250 relative to standpipe pressure (SPP) changes 260. In general, the event detection and control technique of the control system 60 are tuned to at least some of the characteristic behaviors of these events so the control system 60 can detect and distinguish between these events during operations.

In the kick event 220, the flow-out value 224 rapidly increases beyond the flow-in value 222 and only moderately decreases but not to a balanced level. In a HPLV depletion event 230, the flow-out value 234 spikes abruptly beyond the flow-in value 232 before immediately returning.

In the gas expansion or low intensity kick event 240, the flow-out value 244 can rise slowly over time beyond the flow-in value 242. In the gas-at-surface event 250, the flow-out value 254 fluctuates sporadically relative to the flow-in value 252. Finally, during a well control event 260, the SPP change 260 shows a jump and fade.

As can be seen, various parameters of volume, flow-out, flow-in, SPP, SBP, and density-out show a number of trends under different types of events. For illustrative purposes, the characteristics are shown in tabular form in FIG. 6. For example, volume shows an increase during a kick event, a gas expansion event, an HPLV depletion event, and a gas at surface event. The trend of the flow-out shows an increase during a kick event, a gas expansion event, and an HPLV depletion event, but the trend shows erratic behavior during a gas at surface event. A similar arrangement is shown for flow-out versus flow-in.

The standpipe pressure (SPP) shows an increase during a kick event, an HPLV depletion event, and a gas at surface event, but the SPP shows a decrease during a gas expansion event. Similar to volume, the surface backpressure (SBP) shows an increase during a kick event, a gas expansion event, an HPLV depletion event, and a gas at surface event. Finally, the density-out shows no characteristic change during a kick event, a gas expansion event, and an HPLV depletion event, but the density-out shows a decrease during a gas at surface event.

Figure 7A:
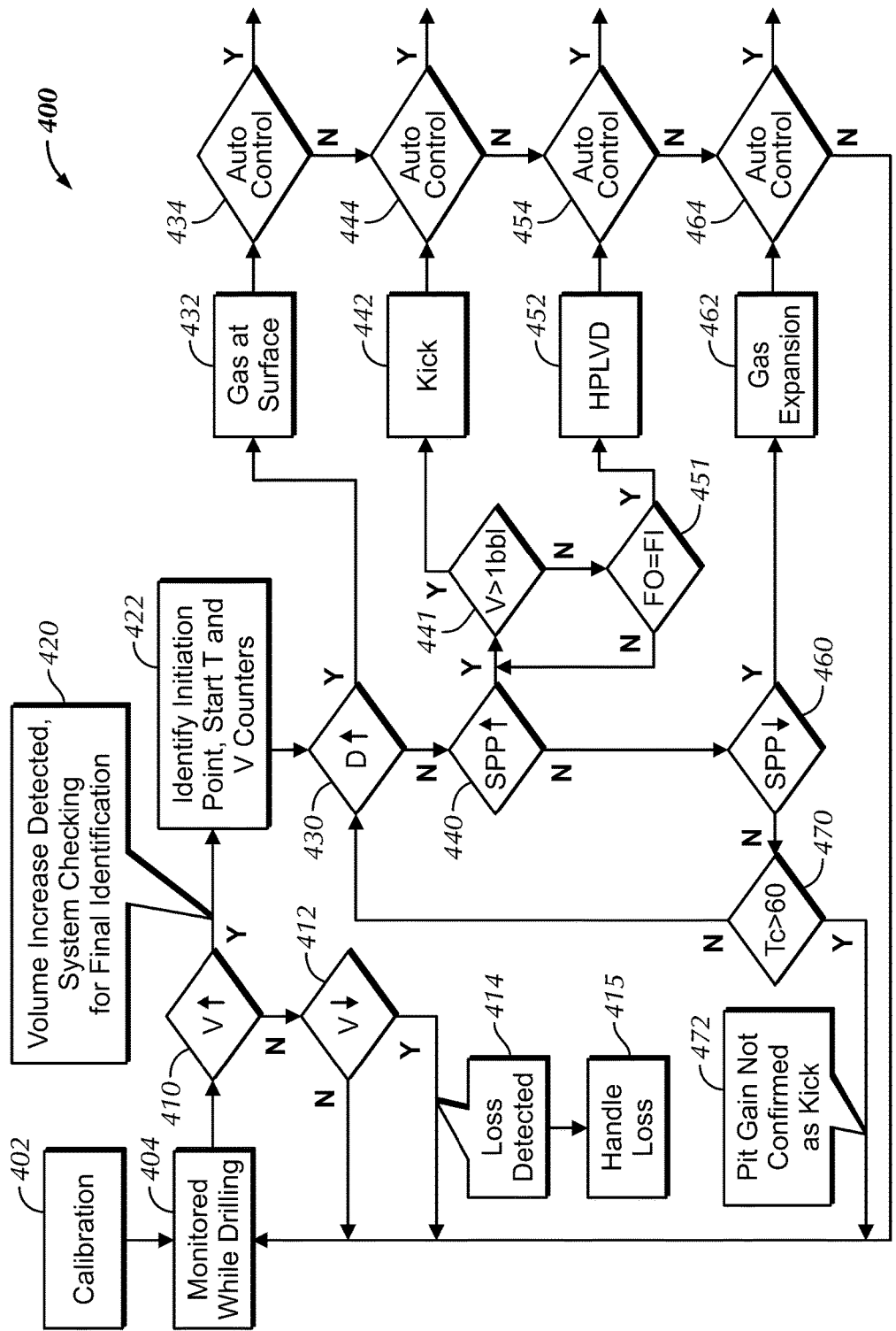
FIGS. 7A-7B illustrates a kick detection and control technique for the disclosed system in flow chart form.
Figure 7B:
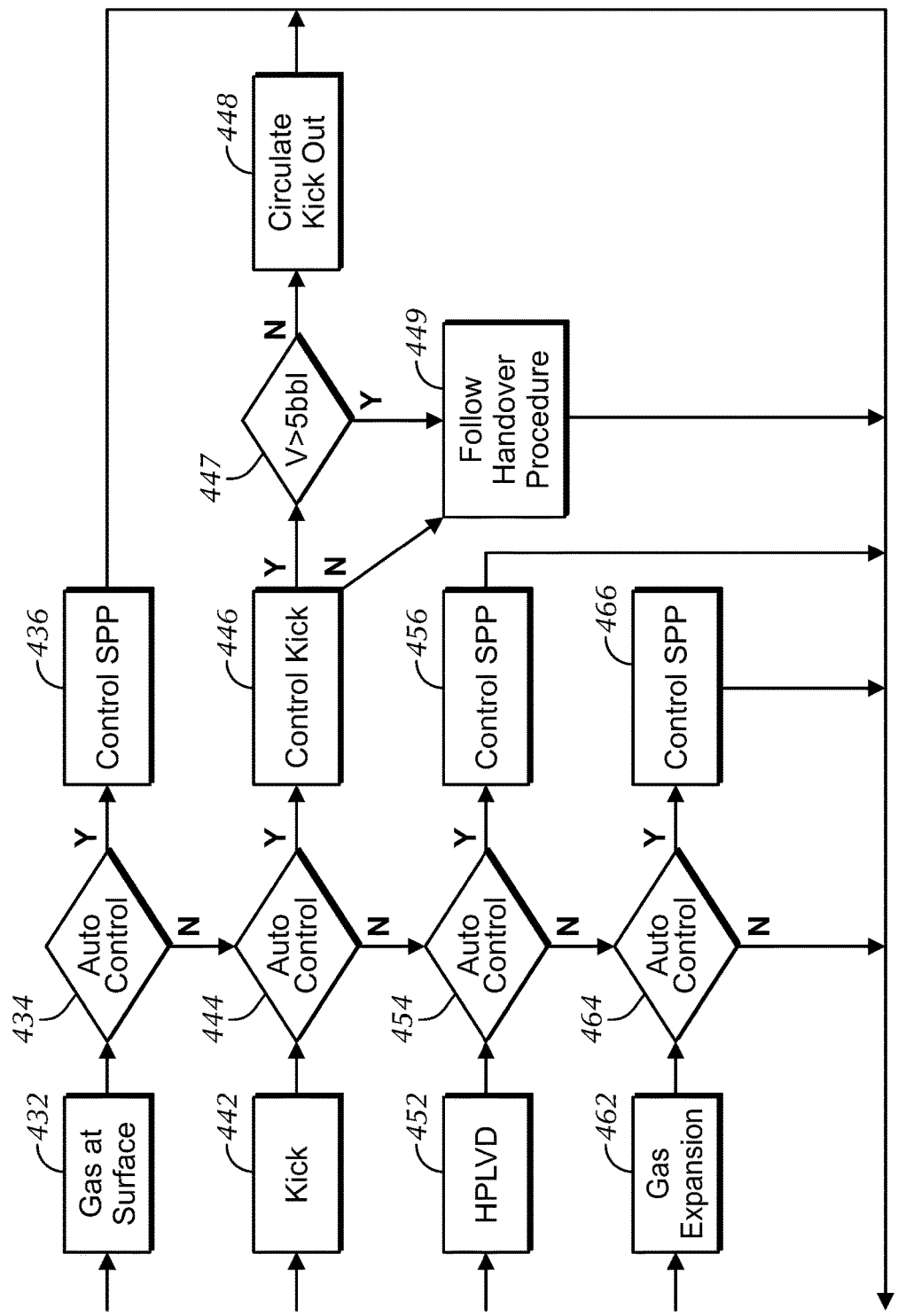

Based on the characteristics of the various events and their trends discussed above, the event detection and control technique of the control system 60 can detect, identify (distinguish), and control these events during operations. In particular, FIGS. 7A-7B illustrate an event detection and control technique 400 for the disclosed control system 60 in flow chart form. In the course of operations discussed below, the system 60 defines and identifies the events separately so false alarms can be eliminated and custom automatic reactions can be applied.

FIG. 7A focuses primarily on the process of detecting and identifying various events during drilling as one of gas-at-surface, kick, HPLVD, and gas expansion based on various monitored parameters. Actions to handle the drilling operation automatically to deal with each of these identified events are outlined primarily in FIG. 7B. Here, auto control features (Blocks 434, 444, 454, etc.) can be used for each of the identified events to initiate the remedial actions in FIG. 7B. Otherwise, even when an event is detected and identified, the system 60 defaults to monitoring the parameters (Block 404) and allows operators to control the drilling operations manually.

Starting in FIG. 7A, the control system 60 is first calibrated before drilling a well section (Block 402). This calibration sets the system 60 for "normal," expected flow and pressure behavior. In offshore drilling operations when heave is a concern, this will also allow the system 60 to recognize how volumes are changing in magnitude and in speed.

In particular, the control system 60 is calibrated for mass balance/compressibility of flow. During drilling operations, for example, mass balance for the fluid in and out of the well should be conserved. Due to frictional losses during circulation and/or SBP applied, drilling fluid will be compressed and this will change the density out reading which is measured by the Coriolis flowmeter 24. Once density-out and mass flow is measured, the control system 60 calculates a volumetric flow-out rate, which is different than flow-in.

Once calibrated for use, the system operations begin with monitoring of the various parameters (e.g., flow-in, flow-out, volume, standpipe pressure, density, etc.) (Block 404). In the monitoring, the control system 60 checks all of the desired parameters and determines how they are changing over time.

Preferably, the control system 60 makes continuous measurements of the "density-in" so the control system 60 is able to achieve a better level of accuracy. As discussed herein, measurements of density-in can be obtained, derived, and the like in many ways. As shown in FIG. 3, for example, the Coriolis flowmeter 52 can be placed on the inlet side of the drilling system 10, circulating in a small flow loop. This flowmeter 52 can be used only for density and temperature measurements, which as discussed below can improve kick detection and all other interpretations dramatically.

In monitoring, the control system 60 also focuses on pump efficiency. A hydraulic model in software can back calculate volumetric "flow-out" during an in-casing test and can measure pump efficiency accordingly. Efficiencies of the pumps 50 are not measured based on Volumetric Flow In=Volumetric Flow Out assumptions. Instead, the pump efficiencies in different flow rates are registered in the control system 60, and the system 60 can then interpolate/extrapolate the pump efficiencies when necessary to judge real increases or decreases.

In monitoring, the control system 60 also focuses on issues related to cavitation. It is known that applying surface backpressure with chokes 22 creates a cavitation effect that can change the density readings and naturally volumetric flow calculation performed with the Coriolis flowmeter 24 after the chokes 22. Different pressures and different mud types define the magnitude of this density drop. The control system 60 preferably avoids this effect by increasing the pressure on the flow downstream of the Coriolis flowmeter 24 for better measurements. An example of this technique is disclosed in U.S. Prov. Appl. 62/080,847, filed 17 Nov. 2014.

When this option is not available in the drilling system 10, this effect can be measured and considered for kick detection by the control system 60 during its analysis. Density drop is a parameter taken into account in the kick detection so the amount of density drop due to cavitation can be known beforehand so the control system 60 can more accurately judge any event during operations.

In monitoring, the control system 60 also focuses on issues related to pressure behavior. With the given mud properties, standpipe pressure and surface backpressure are recorded for different flow rates and flow paths. Using interpolation/extrapolation, control system 60 can then predict expected pressure behavior and identify events accordingly.

In monitoring, the control system 60 also focuses on issues related to heave effects. Heave during floater applications is a concern and challenge for kick detection. The kick detection disclosed herein uses heave signature recognition so relative increases and decreases can be identified in flow rates (volumes). Heave recognition is either automatically determined or is considered based on the system configuration to make proper comparisons. Details of the heave signature recognition are discussed below with respect to FIG. 8.

In general, the detection by the control system 60 can be performed while drilling, while tripping, while making connections. Below, the disclosed monitoring, event detection, and identification are described in the context of monitoring while drilling. As such, the control system 60 as proposed here operates to detect kicks during actual drilling (i.e., when the bit is on bottom and there is circulation in the well). The control system 60 can operate in conjunction with software platforms that identify the operational modes (rig states) of the rig. The disclosed algorithm in FIGS. 7A-7B can be tied to an identified drilling state in the platform, and other modes (states) of the rig can use different or modified detection algorithms accordingly.

Turning now to the detection and identification of various events as outlined in FIG. 7A, the control system 60 initially determines if an initiation volume has increased (Decision 410) or decreased (Decision 412). As can be seen here, the system's detection is driven by volume and is less dependent on time. In this sense, an event can occur downhole, and the system seeks to react to that event as needed by looking first at volume rather than being too time dependent.

The initiation volume can be a numerically calculated volume in the closed-loop system using measurements from the system components, such as the flowmeter 24. In general as disclosed herein, the initiation volume can be a difference in flow-in versus flow-out in the drilling system 10 and can based on mass flow rate, volumetric flow rate, or the like. Additionally, the initiation volume can be based on historical trends. For example, the system 60 can determine that flow-out is increasing when a current trend average of flow-out is greater than a previous trend average of flow-out. This finds an instantaneous change in flow-out. The system 60 can determine that flow-out is greater than flow-in (i.e., increase in initiation volume) by looking at the trend of the flow-out being greater than the sum of the flow-in's trend plus some flow difference limit. This finds how the flow-out is increasing versus the flow-in as a trend. The system can make a comparable determination for flow-out being less than flow-in (i.e., decrease in initiation volume).

If the initiation volume has not increased or decreased, then monitoring of the parameters continues (Block 404). Should a decrease in the initiation volume be detected, however, the system 10 indicates that a loss has occurred (Block 414), and system operations can be performed to handle the loss (Block 415). For example, higher density mud, loss circulation materials (LCM), and the like may be pumped into the wellbore 16, and other remedial measures can be taken.

In particular, once calibration has been done and drilling has commenced, the control system 60 initially looks for any initiation volume increase or decrease (Decisions 410/412). Volume increase/decrease at surface (e.g., pit gain/loss) is primarily and continuously checked by the control system 60. As noted herein, the Coriolis flowmeter 24 can be used to identify this gain based on calibrated "flow-in" and "flow-out" data. Instead of increasing or decreasing trends only, the control system 60 also compares total gain/loss differences in periodical "reference" and "detection" intervals. For example, assuming that the reference time is defined as 60-sec and detection time is defined as 15-sec, the system 60 can look at every 60-sec window and compares the gain/loss with previous matches of 15-sec interval(s).

When there is heave, gain or loss is compared with matching cycle phases so this requires identifying the start and end of cycles too. The heave period is a reference interval identified by the control system 60, and detection intervals are compared according to the reference intervals. Details of these detection and reference intervals are provided with respect to FIG. 8 discussed later.

If there has been an initiation volume increase compared to previous cycles (yes at decision 410), then the control system 60 checks for final identification of the cause and associated remedy for the initiation volume increase (Block 420). To begin this process, the control system 60 identifies an initiation point to find when exactly the event started. The control system 60 then starts an automatic time counter (T) and a volume counter (V) from that point on to track the influx fluid. Having identified in the initiation point and started the time and volume counters (T, V), the control system 60 then goes through a timed loop (Decision 430, 440, 460, 470) to identify the influx causing the initiation volume increase so appropriate actions can be taken.

1. Density Drop Identifying Gas at Surface

As an initial consideration, the control system 60 looks first for a decrease in the density of the fluid flow in the drilling system 10 to identify the event causing the volume increase (influx). In general, the density is not expected to change once the initiation volume increase is detected. However, a detected density drop at surface can be a clear indication of "gas at surface" when a lighter formation fluid is passing through flowmeter 24 at surface. Due to gas expansion, a "flow out" increase in the system 10 may be detected earlier than the influx fluid passing through the flowmeter 24, assuming that the influx fluid is gas. For this reason, the system 10 provides enough time (tc>60-sec) (Decision 470) in the loop of analysis for the system 10 to confirm "gas at surface" events can be predicted based on bubble point pressure/depth and flow rates so false alarms can be avoided.

The control system 60 can determine that the density reading is valid within some threshold to validate that the Coriolis flowmeter 24 is producing stable readings. To determine that the density-out is decreasing, the control system 60 looks at the trend of the density from the initiation point.

If the control system 60 determines that density has decreased at the point of initiation for the subject initiation volume increase (i.e., influx) (Decision 430), then the control system 60 identifies the event as gas at surface (Block 432) so remedial steps can be taken. Gas at surface means that either a kick has been missed or background/drilling gas has traveled up to surface so that the bottomhole pressure is being reduced by contaminating drilling fluid. In any case, there is a risk that operations cannot maintain the sufficient or planned BHP during drilling.

The best reaction to this event is to bring the standpipe pressure to a point that will prevent BHP drops. As shown in FIG. 7B, for example, the control system 60 can automatically handle the gas at surface event with a first standpipe pressure control (Block 436) if an auto control function is on (Decision 434).

2. Standpipe Pressure Increase Identifying Kick or Depletion

If the event is not identified as a gas at surface event because density has not been measured as dropping yet at surface, then the control system 60 determines whether the standpipe pressure has increased from the point of initiation for the subject initiation volume increase (Decision 440). Standpipe pressure (SPP) is a good indicator of BHP changes. This is why standpipe pressure can be used to maintain BHP constant during well control activities. Since the fluid in the drillstring is not contaminated with the influx fluid and is also compressed during drilling/circulating activity, the standpipe pressure shows BHP changes effectively. With the help of high resolution digital sensors that the system 10 uses, measurements of the standpipe pressure can be used as a reliable source for kick detection.

Even though SPP is expected to decrease in time after lighter influx fluid is in the annulus, a sudden pressure spike in the SPP is typically observed at the beginning of a kick event. Kick fluid flows from a higher pressure environment in the formation to the lower pressure environment in the annulus. Therefore, once the kick formation is encountered, the SPP increase can be measured. In detecting the increase, the SPP after the initiation point is compared with previous cycles. A flow-out increase and the SPP increase are synchronized, making detecting the increase from the kick easier.

To determine that SPP is increasing (Decision 440), the system 10 looks at the trend of the SPP from the initiation point. The current SPP reading over the stable SPP reading may need to be greater than or equal to a Maximum Allowable SPP increase. The stable SPP reading can be based on the situation where flow-out is not increasing, flow-out is not greater than the flow-in, and density-out is not increasing.

If the SPP has increased, the system 10 looks at preliminary conditions to distinguish specifically between a kick event (Block 442) versus a HPLVD event (Block 452) so the reaction can be customized. First, the control system 60 determines whether a reaction volume (i.e., cumulative volume from counter (V)) has increased beyond a threshold (Decision 441) and, if so, the control system 60 identifies the event as a kick (Block 442) so additional remedial steps can be taken.

In particular, once the SPP increase is confirmed, the control system 60 checks the volume counter (V) that was initiated to determine the cumulative reaction volume. If the reaction volume is bigger than a predetermined and configurable threshold, the event is treated as a kick (Block 442) since a significant pressure drop in the BHP will result above this volume.

As then shown in FIG. 7B when the system 10 determines a kick has been detected (442), the control system 60 initiates dynamic well control techniques (446). For example, if an auto control function is "On," the control system 60 applies surface backpressure to stop formation flow and adds a safety margin. Additionally, the control system 60 checks the total count of volume (V) that will determine maximum expected pressure to circulate the kick out (Decision 447). If the volume (V) will be bigger than predicted to be a safe number dictated by a "well control matrix," then the system 60 will guide the operator to a "handover procedure" (Block 449). Otherwise, the kick will be circulated out of the drilling system 10 (Block 448).

Should the reaction volume (V) have not increased over the threshold (no at decision 441), the system 60 iterates in a separate loop until either the flow-out is equivalent to the flow-in (i.e., FO=FI when there is no heave) or the flow-out in the current cycle is equivalent to the flow-out in the previous cycle (i.e., $FO_{current} = FO_{previous}$ when there is heave involved). These comparisons are performed to distinguish between real kicks and quick limited volume depletions.

Should the reaction volume not be greater than the threshold (No at Decision 441), then a check is made to determine if the flow-out is the same as the flow-in indicating flow balance (Decision 451). If this is not true, then reassessment of the reaction volume can be performed (441), otherwise with the flow balanced, the control system 60 determines that a HPLVD event (453) is occurring. The control system 60 then initiates a second form of SPP controls (456) to handle the limited volume depletion.

As shown in FIG. 7A, for instance, the control system 60 determines whether the flow-out has remained equivalent to flow-in when there is no heave (Decision 451). If so, then the control system 60 identifies the event as a HPLVD (Block 452) so additional remedial steps can be taken as discussed later. If there is no equivalency in the flow-in and flow-out, however, the control system 60 can reassess the cumulative reaction volume (V) against the threshold (Decision 441).

The reaction volume's threshold in Decision 441 can be user-defined and can be based on particular policies and parameters. As an example, the volume threshold can be set to 1-bbl. In any event, the threshold is used to decide how big of a cumulative volume increase resulting in standpipe pressure increase should be treated as a kick. If the volume is below that threshold and the formation has depleted itself, then the control system 60 reacts by controlling SPP and allowing formation fluid to travel to the surface while maintaining the SPP and as a result maintaining the BHP. Otherwise, even if the formation can be depleted in relatively short period of time, since it is calculated that the total volume will cause a significant drop in hydrostatic head, the event can be controlled with dynamic well control techniques (Block 446).

3. Standpipe Pressure Decrease Identifying Gas Expansion

Should the density not have decreased (no at Decision 430) and should the standpipe pressure not have increased (no at Decision 440), then the control system 60 can determine whether the standpipe pressure has decreased (Decision 460). If so, then the system 60 identifies the event as a gas expansion (Block 462) so additional remedial steps can be taken as shown in FIG. 7B.

In particular, the system 60 may have so far missed a kick detection. Formation fluid may be entering into the wellbore and moving up with circulation, but may not have reached surface yet. Assuming that the event is a gas kick, the influx of gas will reduce the density of the annulus as there will be less and less hydrostatic head on top of the kick. The gas will move the front end fluid faster, and the system 60 will detect an increasing flow rate in the Coriolis flowmeter 24 while the SPP will be dropping. For this reason, the system's determination that SPP is decreasing (yes at Decision 460) can help to distinguish between a kick (when it is happening) versus a gas expansion (missed kick or background gas). The gas expansion can show almost the same signature as a kick except that the SPP is dropping instead of increasing. Once gas expansion (Block 462) is detected as shown in FIG. 7B, the system 10 switches to a third SPP control to maintain BHP at a desired level.

If none of the identifications of gas at surface 432, kick 442, volume depletion 452, or gas expansion 462 are made, then a final determination can be made whether the overall interval timer (T) is greater than a defined interval (e.g., 60-sec) (Decision 470). If not, then more time can be given to analyzing the parameters detected by the system 10 from the initiation point, and the process goes through the determinations again looking at whether density decreased detected (Block 430), etc.

If none of these identifications has been made and the overall timer (T) has past the defined interval, then the control system 60 can return to monitoring (Block 404). In essence, the system 60 can determine that the initiation volume increase (e.g., pit gain) has not been confirmed as a kick.

During drilling, the system 60 continuously monitors and stores historical data, such as the flow-in and flow-out values, for analysis by the system. As noted above, analysis of the drilling parameters to identify an event involves determining an initiation point of a volume increase using detection and reference intervals when heave is or is not a consideration. Details of analyzing such historical data and detecting the initiation point are discussed below with reference to FIG. 8.

E. Initiation Point Identification

Figure 8:
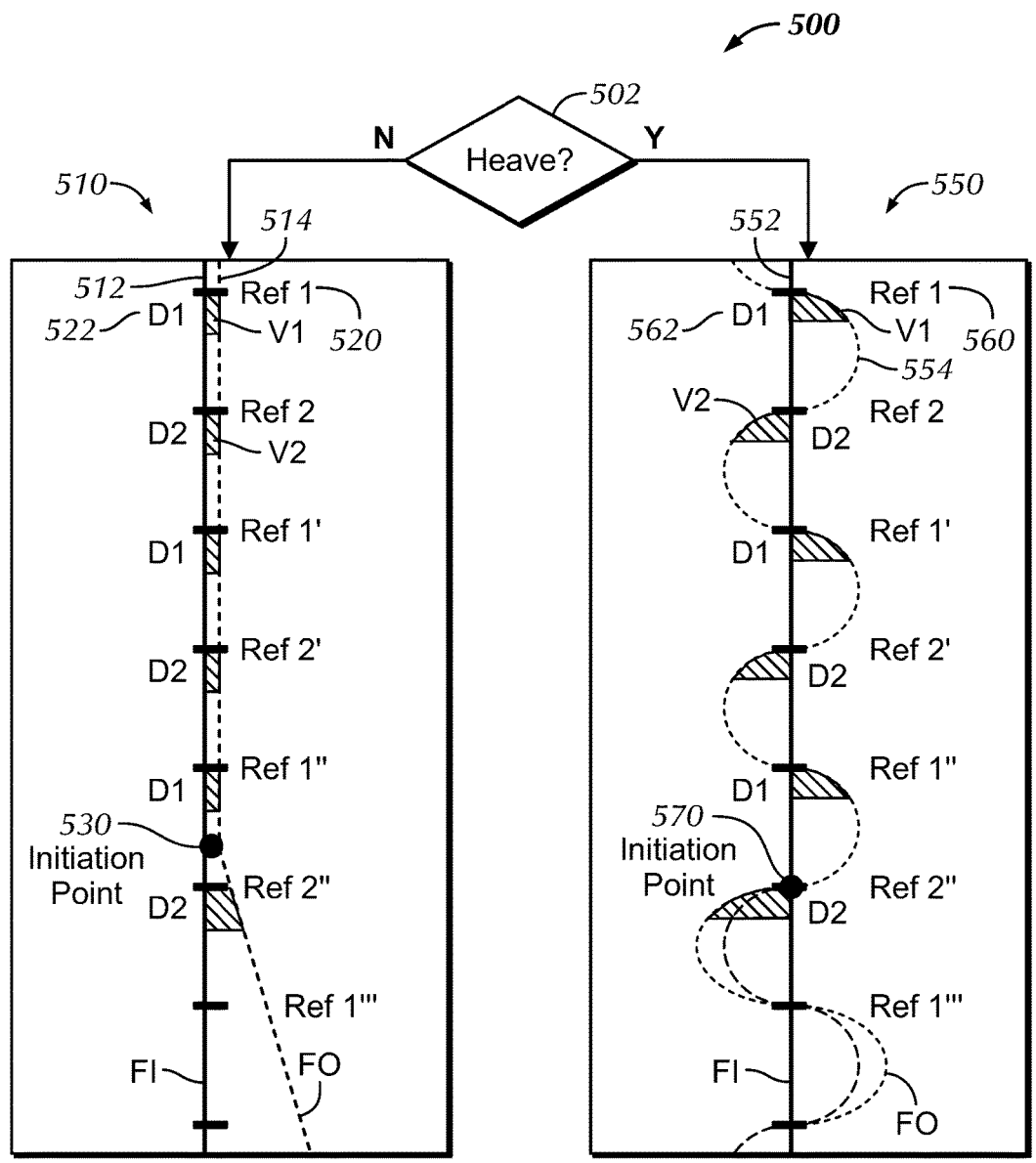
FIG. 8 illustrates a process for identifying an initiation point when heave is or is not a consideration during kick detection.

FIG. 8 illustrates a process 500 for identifying an initiation point when heave is or is not a consideration. As noted above in FIG. 7A, the identification process 400 first involves detecting a volume increase (influx) (Decision 412). Once the volume increase is detected, the control system 60 identifies the initiation point of the volume increase (influx) so counters (T, V) can be started (Block 422).

As part of this identification, a determination (Decision 502) in FIG. 8 is made whether heave should or should not be part of the identification. If heave is not a consideration (no at decision 502), the control system 60 looks at the historical flow data 510 and analyzes the differences between the flow-in 512 and flow-out 514 at periodic "reference" intervals 520. The total flow difference (i.e., volume) at each reference interval is calculated during a "detection" interval 522. In general, the detection interval 522 is shorter than the reference interval. In one example, the reference interval can be defined as 60-sec intervals, and the detection interval can be defined as 15-sec intervals. These intervals can be predetermined in the system, user-defined, or automatically configured based on previously learned processing.

The system 60 looks at every reference interval 520 and compares the calculated flow difference with previous matches of the detection interval(s) 522. One way to perform this comparison is to simply look at every successive reference interval 520 so that the flow differences for the detection intervals 522 at these reference intervals 520 can be successively compared to one another. The comparison will identify a change in the flow difference so that the initiation point can be determined as the point 530 between the reference intervals 520 where the change first occurred.

A different way to perform this comparison follows a pattern more consistent with the heave detection process described later. In this comparison, every other reference interval 520 (ref. 1, ref. 1', ref. 1", etc.; and ref. 2, ref. 2', ref. 2", etc.) is grouped together so that the flow differences V1, V2 for the detection intervals D1, D2 at these reference intervals 520 can all be respectively compared to one another. The comparisons will identify changes in the flow differences V1, V2 so that the initiation point can be determined as the point 530 between the reference intervals 520 where the changes first occurred.

Knowing this initiation point 530, the system can then initiate the time counter (T) and the volume counter (V) for subsequent use in identifying the reaction volume based on the historical data for density, standpipe pressure, flow-in, flow-out, volume, etc.—each of which is logged and stored for historical analysis from the determined initiation point of the event.

When there is heave (yes at decision 502), the system 60 again looks at the historical flow data 550 and analyzes the differences between the flow-in 552 and flow-out 554 at periodic "reference" intervals 560. Due to heave, however, the gain or loss follows cycles due to the rise and fall of drilling vessel or the like. Therefore, the system 60 compares matching cycle phases with one another so this requires identifying the start and end of cycles. Accordingly, the heave period is a reference interval 560 identified by the system 10, and detection intervals 562 are compared according to the reference intervals 560.

In particular, the system 10 looks at every reference interval 560 (ref. 1, ref. 1', ref. 1", etc.) for the start of the cycles and compares the calculated flow difference V1 with previous matches of the detection intervals 562 (D1). Similarly, the system 60 looks at every other reference interval 560 (ref. 2, ref. 2', ref. 2", etc.) for the end of the cycles and compares the calculated flow difference V2 with previous matches of the detection intervals 562 (D2). The comparisons will identify changes in the flow differences V1, V2 so that the initiation point can be determined as the point 570 between the reference intervals 520 where the changes first occurred.

Knowing this initiation point 570, the system 60 can then initiate the time counter (T) and the volume counter (V) for subsequent use in identifying the reaction volume based on the historical data for density, standpipe pressure, flow-in, flow-out, volume, etc.—each of which is logged and stored for historical analysis from the determined initiation point of the event.

Although the above detection has been discussed with reference to a flow difference between flow-in and flow-out that can be subject to heave effects, any of the other measured parameters associated with the drilling system 10 that are subject to heave effects can also be similarly treated.

As disclosed herein, reference to "flow," such as measurements of "flow-in" and "flow-out," can refer to mass flow rate, volumetric flow rate, or other such parameter. As will be appreciated, mass flow can be calculated from volumetric flow and density. Of course, variables of density, fluid composition, temperatures, pressure, and the like can be used to refine any of the various calculations performed by the system.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable or programmable storage device for execution by a programmable processor or control device so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Such a system can have one or more interfaces, storage for storing information, and a processing unit in communication with the one or more interfaces and the storage. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A controlled pressure drilling method of a borehole with a drilling system, the drilling system having at least one processing unit associated with one or more sensors and with one or more controls, the method comprising:
monitoring, using the one or more sensors, parameters including flow-in, flow-out, density, and standpipe pressure;
detecting, at a detection point using the at least one processing unit based on the monitored parameters, a change between the flow-in and the flow-out as a volume increase of the flow-out compared to the flow-in;
identifying, using the at least one processing unit in response to the detection, an initiation point of the detected change, the initiation point being before the detection point;
identifying, using the at least one processing unit based on the monitored parameters from the initiation point up to a decision point after the initiation point, an event from the initiation point as being a gas-at-surface event by detecting a decrease in density from the initiation point; and
initiating, using the one or more controls, an action in the drilling system in response to the identified gas-at-surface event.

2. The method of claim 1, wherein detecting the change between the flow-in and the flow-out comprises detecting the change as a trend of the volume increase.

3. The method of claim 1, wherein detecting the change between the flow-in and the flow-out comprises detecting the change as a cumulative of the volume increase.

4. The method of claim 1, wherein detecting the decrease in the density from the initiation point comprises comparing a density-out value, measured at surface with a Coriolis flowmeter of the one or more sensors at an outlet of the drilling system from the borehole, with a density-in value.

5. The method of claim 4, wherein monitoring the parameters comprises measuring the density-in value at surface with another Coriolis flowmeter of the one or more sensors at an inlet of the drilling system to the borehole.

6. The method of claim 1, wherein detecting the decrease in density from the initiation point comprises detecting the decrease within a time limit from the initiation point.

7. The method of claim 1, wherein initiating, using the at least one control, the action in the drilling system in response to the identified gas-at-surface event comprising initiating the one or more controls as a control of the standpipe pressure.

8. The method of claim 7, wherein initiating the control of the standpipe pressure comprises bringing the standpipe pressure to a point preventing a drop in bottom hole pressure.

9. The method of claim 1, wherein to identify the gas-at-surface event, detecting the decrease in the density from the initiation point comprises detecting the decrease in density at surface at a point-in-time from the initiation point at least before an interval-of-time in which fluid from an influx event in the borehole is expected at the surface.

10. The method of claim 1, wherein the decision point comprises a point-in-time after the initiation point based on the monitored parameters in the drilling system in which the decrease in the density from the gas-at-surface event is at least expected at surface.

11. A controlled pressure drilling method of a borehole with a drilling system, the drilling system having at least one processing unit associated with one or more sensors and with one or more controls, the method comprising:
monitoring, using the one or more sensors, parameters including flow-in, flow-out, density, and standpipe pressure;
detecting, at a detection point using the at least one processing unit based on the monitored parameters, a change between the flow-in and the flow-out as a volume loss of the flow-out compared to the flow-in;
identifying, using the at least one processing unit in response to the detection, an initiation point of the detected change, the initiation point being before the detection point;
identifying, using the at least one processing unit based on the monitored parameters from the initiation point up to a decision point after the initiation point, an event from the initiation point for the detected volume loss as being a fluid loss event; and
initiating, using the one or more controls, an action in the drilling system in response to the identified fluid loss event.

12. A controlled pressure drilling method of a borehole with a drilling system, the drilling system having at least one processing unit associated with one or more sensors and with one or more controls, the method comprising:
monitoring, using the one or more sensors, parameters including flow-in, flow-out, density, and standpipe pressure;
detecting, at a detection point using the at least one processing unit based on the monitored parameters, a change between the flow-in and flow-out;
identifying, using the at least one processing unit in response to the detection, an initiation point of the detected change, the initiation point being before the detection point;
detecting, using the at least one processing unit based on the monitored parameters, an absence of a decrease in the density since the initiation point up to a decision point after the initiation point;
identifying, using the at least one processing unit based on the monitored parameters from the initiation point in response to the detected absence, an event from the initiation point as being one of a kick event, a high-pressure low-volume depletion event, and a gas expansion event; and
initiating, using the one or more controls, an action in the drilling system in response to the identified event.

13. The method of claim 12, wherein identifying the event as the kick event or the high pressure loss volume depletion event comprises determining that the standpipe pressure has increased from the initiation point.

14. The method of claim 12, wherein identifying the event as the gas expansion event comprises determining that the standpipe pressure has decreased from the initiation point.

15. The method of claim 12, wherein monitoring the parameters comprises processing the monitored parameters at a time interval of several times per second.

16. The method of claim 12, wherein identifying the one of the kick event, the high-pressure low-volume depletion event, and the gas expansion event comprises identifying based on the monitored parameters from the initiation point during the detected absence of the decrease in the density.

17. The method of claim 12, wherein the decision point comprises a point-in-time after the initiation point based on the monitored parameters in the drilling system in which the decrease in the density from a gas-at-surface event is at least expected at surface.

18. A controlled pressure drilling method of a borehole with a drilling system, the drilling system having at least one processing unit associated with one or more sensors and with one or more controls, the method comprising:
  monitoring, using the one or more sensors, parameters including flow-in, flow-out, density, and standpipe pressure;
  detecting, at a detection point using the at least one processing unit based on the monitored parameters, a change between the flow-in and flow-out; and
  identifying, using the at least one processing unit in response to the detection, an initiation point of the detected change, the initiation point being before the detection point;
  identifying, using the at least one processing unit based on the monitored parameters from the initiation point up to a decision point after the initiation point, an event from the initiation point as being a kick event by:
    determining that the standpipe pressure has increased from the initiation point without the density decreasing since the initiation point, and
    determining that a cumulative volume value from the initiation point is above a first threshold; and
  initiating, using the one or more controls, an action in the drilling system in response to the identified kick event.

19. The method of claim 18, wherein determining that the standpipe pressure has increased from the initiation point comprises determining that a trend of the standpipe pressure has increased since the initiation point at least above a given standpipe pressure reading.

20. The method of claim 18, wherein determining that the cumulative volume value from the initiation point is above the first threshold comprises making the first threshold configurable.

21. The method of claim 18, wherein initiating, using the one or more controls, the action in the drilling system in response to the identified kick event comprises applying surface backpressure to the drilling system.

22. The method of claim 18, wherein to identify the kick event, determining that the standpipe pressure has increased from the initiation point without the density decreasing since the initiation point comprises detecting an absence of the decrease in the density at surface at least until an interval-of-time has passed.

23. The method of claim 18, where the decision point comprises a point-in-time after the initiation point based on the monitored parameters in the drilling system in which at least one of (a) the decrease in the density from a gas-at-surface event is at least expected at surface, and (b) the increase in the standpipe pressure is at least expected to exceed a second threshold.

24. The method of claim 18, wherein the decision point comprises a defined time interval based on the monitored parameters in the drilling system at least before formation fluid associated with the kick event downhole in the borehole is expected at surface.

25. A controlled pressure drilling method of a borehole with a drilling system, the drilling system having at least one processing unit associated with one or more sensors and with one or more controls, the method comprising:
  monitoring, using the one or more sensors, parameters including flow-in, flow-out, density, and standpipe pressure;
  detecting, at a detection point using the at least one processing unit based on the monitored parameters, a change between the flow-in and flow-out; and
  identifying, using the at least one processing unit in response to the detection, an initiation point of the detected change, the initiation point being before the detection point;
  identifying, using the at least one processing unit based on the monitored parameters from the initiation point up to a decision point after the initiation point, an event from the initiation point as being a high pressure loss volume depletion event by:
    determining that the standpipe pressure has increased from the initiation point without the density decreasing since the initiation point, and
    determining that a flow balance exists from the initiation point; and
  initiating, using the one or more controls, an action in the drilling system in response to the identified depletion event.

26. The method of claim 25, wherein determining that the flow balance exists between from the initiation point comprises determining that the flow balance exists between the flow-out and the flow-in without heave.

27. The method of claim 25, wherein determining that the flow balance exists between from the initiation point comprises determining that the flow balance exists between the flow-out in a current heave cycle and the flow-out in a previous heave cycle.

28. The method of claim 25, wherein initiating, using the one or more controls, the action in the drilling system in response to the identified depletion event comprises initiating the one or more controls as a control of the standpipe pressure in response to the identified depletion event.

29. The method of claim 25, wherein to identify the high pressure loss volume depletion event, determining that the standpipe pressure has increased from the initiation point without the density decreasing since the initiation point comprises detecting an absence of the decrease in the density at surface at least until an interval-of-time has passed.

30. The method of claim 25, where the decision point comprises a point-in-time after the initiation point based on the monitored parameters in the drilling system in which at least one of: (a) the decrease in the density from a gas-at-surface event is at least expected at surface, (b) the increase in the standpipe pressure is at least expected to exceed a threshold, and (c) the flow balance is at least expected to occur.

31. A controlled pressure drilling method of a borehole with a drilling system, the drilling system having at least one processing unit associated with one or more sensors and with one or more controls, the method comprising:
  monitoring, using the one or more sensors, parameters including flow-in, flow-out, density, and standpipe pressure;

detecting, at a detection point using the at least one processing unit based on the monitored parameters, a change between the flow-in and flow-out; and identifying, using the at least one processing unit in response to the detection, an initiation point of the detected change, the initiation point being before the detection point;

identifying, using the at least one processing unit based on the monitored parameters from the initiation point up to a decision point after the initiation point, an event from the initiation point as being a gas expansion event by determining that the standpipe pressure has decreased from the initiation point without the density decreasing since the initiation point; and initiating, using the one or more controls, an action in the drilling system in response to the identified gas expansion event.

32. The method of claim 31, wherein determining that the standpipe pressure has decreased from the initiation point comprises determining that a trend of the standpipe pressure has decreased since the initiation point.

33. The method of claim 31, wherein initiating, using the one or more controls, the action in the drilling system in response to the identified gas expansion event comprises initiating the one or more controls as a control of the standpipe pressure.

34. The method of claim 31, wherein to identify the gas expansion event, determining that the standpipe pressure has decreased from the initiation point without the density decreasing since the initiation point comprises detecting an absence of the decrease in the density at surface at least until an interval-of-time has passed.

35. The method of claim 31, where the decision point comprises a point-in-time after the initiation point based on the monitored parameters in the drilling system in which at least one of: (a) the decrease in the density from a gas-at-surface event is at least measurable at surface, and (b) the decrease in the standpipe pressure is at least expected to occur over time from the initiation point before formation fluid associated with the event has reached surface.

36. A programmable storage device having program instructions stored thereon for causing a programmable control device to perform a method according to claim 1, 11, 12, 18, 25, or 31.

37. A drilling apparatus used with a drilling system to drill a borehole, the drilling system having one or more sensors and having one or more controls, the apparatus comprising:

one or more interfaces obtaining parameters from the one or more sensors, the parameters including flow-in, flow-out, density, and standpipe pressure during the drilling of the borehole with the drilling system;

storage storing the parameters; and a processing unit in communication with the one or more controls, the one or more interfaces, and the storage, the processing unit configured to perform a method according to claim 1, 11, 12, 18, 25, or 31.

* * * * *